US010306500B2

(12) United States Patent
Jeong et al.

(10) Patent No.: US 10,306,500 B2
(45) Date of Patent: May 28, 2019

(54) METHOD AND DEVICE FOR CONTROLLING DATA TRAFFIC DURING ACCESS TO WIRELESS LAN AND CELLULAR NETWORK

(71) Applicant: Samsung Electronics Co., Ltd., Suwon-si, Gyeonggi-do (KR)

(72) Inventors: Sangsoo Jeong, Suwon-si (KR); Songyean Cho, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 52 days.

(21) Appl. No.: 15/306,245

(22) PCT Filed: Apr. 27, 2015

(86) PCT No.: PCT/KR2015/004173
§ 371 (c)(1),
(2) Date: Oct. 24, 2016

(87) PCT Pub. No.: WO2015/163743
PCT Pub. Date: Oct. 29, 2015

(65) Prior Publication Data
US 2017/0048739 A1 Feb. 16, 2017

(30) Foreign Application Priority Data

Apr. 25, 2014 (KR) .......... 10-2014-0050316
Jun. 10, 2014 (KR) .......... 10-2014-0070366

(51) Int. Cl.
H04W 24/10 (2009.01)
H04W 4/70 (2018.01)
(Continued)

(52) U.S. Cl.
CPC ............. H04W 24/10 (2013.01); H04L 67/10 (2013.01); H04W 4/70 (2018.02); H04W 28/10 (2013.01);
(Continued)

(58) Field of Classification Search
CPC ....... H04W 24/10; H04W 4/70; H04W 8/082; H04W 4/005; H04W 88/06; H04W 48/18; H04W 28/10; H04L 67/10
See application file for complete search history.

(56) References Cited

U.S. PATENT DOCUMENTS

2005/0130660 A1  6/2005  Park et al.
2012/0324100 A1* 12/2012  Tomici .................. H04L 45/123
                                                709/224
(Continued)

FOREIGN PATENT DOCUMENTS

KR  10-2007-0112229 A   11/2007
KR     10-1194031 B1    10/2012
WO    2013/105817 A1     7/2013

OTHER PUBLICATIONS

3GPP, "Network based IP flow mobility", Nov. 26, 2012. (Year: 2012).*

Primary Examiner — Peter P Chau
(74) Attorney, Agent, or Firm — Jefferson IP Law, LLP

(57) ABSTRACT

A communication method for incorporating an IoT technique with a 5G communication system for supporting a higher data transmission rate in comparison with a 4G system and subsequent systems and a system therefor are disclosed. The present invention can be applied to intelligent services (for example, services related to smart homes, smart buildings, smart cities, smart cars or connected cars, health care, digital education, retail business, security, and safety) on the basis of a 5G communication technique and IoT-related techniques. A method for transmitting and receiving (Continued)

a signal in a terminal of a mobile communication system, according to one embodiment of the present specification, comprises the steps of establishing an access for a specific PDN connection with a base station and a wireless local area network (WLAN); detecting that the access through the WLAN is unusable; and transmitting, to a mobility management entity (MME), a control message for moving traffic through the WLAN, through the base station. According to one embodiment of the present specification, a traffic transmission path of the terminal capable of accessing both a 3GPP network and a non-3GPP network can be controlled in the network and the traffic transmission path can be determined according the states of the network and the terminal, thereby effectively utilizing limited communication resources.

4 Claims, 20 Drawing Sheets

(51) Int. Cl.

| | | |
|---|---|---|
| *H04W 28/10* | (2009.01) | |
| *H04W 48/18* | (2009.01) | |
| *H04W 88/06* | (2009.01) | |
| *H04L 29/08* | (2006.01) | |
| *H04W 36/14* | (2009.01) | |
| *H04W 36/22* | (2009.01) | |
| *H04W 36/00* | (2009.01) | |

(52) U.S. Cl.
CPC ........... *H04W 36/14* (2013.01); *H04W 48/18* (2013.01); *H04W 88/06* (2013.01); *H04W 36/0085* (2018.08); *H04W 36/00837* (2018.08); *H04W 36/22* (2013.01)

(56) References Cited

U.S. PATENT DOCUMENTS

| | | | |
|---|---|---|---|
| 2013/0070596 | A1 | 3/2013 | Yeh et al. |
| 2014/0098789 | A1 | 4/2014 | Liu et al. |
| 2014/0211616 | A1* | 7/2014 | Salot ................ H04W 28/0289 370/230 |
| 2014/0321328 | A1* | 10/2014 | Zuniga .................... H04W 8/06 370/254 |
| 2014/0355590 | A1 | 12/2014 | Cho et al. |
| 2015/0109930 | A1* | 4/2015 | Duan .................... H04W 28/10 370/235 |
| 2015/0181504 | A1* | 6/2015 | Tsai ...................... H04W 36/22 370/331 |
| 2015/0195863 | A1* | 7/2015 | Reznik .............. H04W 28/0215 370/228 |
| 2016/0066232 | A1* | 3/2016 | Wang .................... H04W 48/18 370/332 |
| 2017/0026824 | A1* | 1/2017 | Kim ........................ H04W 8/08 |

* cited by examiner

METHOD AND DEVICE FOR CONTROLLING DATA TRAFFIC DURING ACCESS TO WIRELESS LAN AND CELLULAR NETWORK

TECHNICAL FIELD

The present invention relates to a technology for facilitating data communication using a 3GPP system such as LTE and a non-3GPP system such as Wireless LAN in a network in which 3GPP and non-3GPP systems coexist. In detail, the present invention relates to a technology for selecting an access network for controlling connections in consideration of subscriber information and an operator's network condition and for transmitting traffic when a user terminal establishes traffic connections through both the 3GPP and non-3GPP systems simultaneously.

BACKGROUND ART

Mobile communication systems were developed to provide the subscribers with voice communication services on the move. Recently, the mobile communication systems have evolved beyond the early voice-oriented services to the level of supporting high speed data communication services. However, resource shortages and user requirements for higher speed services are spurring evolution towards increasingly more advanced mobile communication systems.

As one of the next-generation mobile communication systems for meeting such requirements, the $3^{rd}$ Generation Partnership Project (3GPP) has standardization underway for a Long Term Evolution (LTE) system. LTE is a technology designed to provide high speed packet-based communication of up to 100 Mbps and aims at commercial deployment around a 2010 timeframe. In order to accomplish this aim, a discussion is being held on several schemes: for example, one scheme for reducing the number of nodes located in a communication path by simplifying a configuration of the network and another scheme for maximally approximating wireless protocols to wireless channels.

In order to meet the wireless data traffic demand that has grown since the commercialization of $4^{th}$ Generation (4G) communication systems, many studies have been conducted to develop an enhanced 5G or pre-5G communication system. For this reason, the 5G or pre-5G communication system is also called a beyond-4G communication system or a post Long Term Evolution (LTE) system. Consideration is being given to implementing the 5G communication system in millimeter wave (mm Wave) frequency bands (e.g., 28 GHz and 60 GHz bands) to accomplish higher data rates. In order to increase the propagation distance by mitigating propagation loss in the 5G communication system, discussions are underway about various techniques such as beamforming, massive MIMO, Full Dimensional MIMO (FD-MIMO), array antenna, analog beamforming, and large scale antenna. Also, in order to enhance network performance of the 5G communication system, developments are underway of various techniques such as evolved small cell, advanced small cell, cloud Radio Access Network (RAN), ultra-dense network, Device to Device (D2D) communication, wireless backhaul, moving network, cooperative communication, Coordinated Multi-Points (CoMP), and interference cancellation. Furthermore, the ongoing research includes the use of Hybrid FSK and QAM modulation and Sliding Window Superposition Coding (SWSC) as Advanced Coding Modulation (ACM), Filter Bank Multi Carrier (FBMC), Non-Orthogonal Multiple Access (NOMA), and Sparse Code Multiple Access (SCMA).

Meanwhile, the Internet is evolving from a human-centric communication network in which information is generated and consumed by humans to the Internet of Things (IoT) in which distributed things or components exchange and process information. The combination of the cloud server-based Big data processing technology and the IoT begets Internet of Everything (IoE) technology. In order to secure the sensing technology, wired/wireless communication and network infrastructure, service interface technology, and security technology required for implementing the IoT, recent research has focused on sensor network, Machine to Machine (M2M), and Machine Type Communication (MTC) technologies. In the IoT environment, it is possible to provide an intelligent Internet Technology that is capable of collecting and analyzing data generated from connected things to create new values for human life. The IoT can be applied to various fields such as smart home, smart building, smart city, smart car or connected car, smart grid, health care, smart appliance, and smart medical service through legacy Information Technology (IT) and the convergence of various industries. Thus there are various attempts to apply the IoT to the 5G communication system. For example, sensor network, Machine to Machine (M2M), and Machine Type Communication (MTC) technologies are implemented by means of the 5G communication technologies such as beamforming, MIMO, and array antenna. The application of the aforementioned cloud RAN as a big data processing technology is an example of convergence between the 5G and IoT technologies.

In such a mobile communication system, it may be possible for a terminal to use multiple heterogeneous networks. In particular, it may be possible for the terminal to use a 3GPP access network such as GERAN/UTRAN/E-UTRAN and a non-3GPP access network such as Wireless Local Area Network (WLAN). For example, the user terminal may access an E-UTRAN and a WLAN simultaneously for data communication; therefore, there is a need of a method and apparatus for the network to control the user terminal optimally in consideration of subscriber information and network condition.

DISCLOSURE OF INVENTION

Technical Problem

In the case where a user terminal is served by a non-3GPP system for a service through a Packet Data Network (PDN), it may be necessary to establish a connection to the PDN Gateway (P-GW). For an operator's network configuration and increasing the degree of freedom of service for users, it is necessary for the network to allow the user terminal to establish one or more PDN connections with the same Access Point Name (APN) even when one user terminal connects to the network through a WLAN. Also, it may be possible to have a method that enables a user terminal to communicate traffic data through the 3GPP and non-3GPP systems simultaneously with a single IP address. At this time, connection establishment/release and access network selection for communication should be determined in consideration of subscriber information and the operator's network condition; therefore, there is a need of an apparatus and method for controlling network connection and traffic communication.

Solution to Problem

In accordance with an aspect of the present invention, a signal communication method of a terminal in a mobile communication system includes establishing connections to a base station and a Wireless Local area Network (WLAN) for access to a PDN, detecting that WLAN connection is unusable, and transmitting to a Mobility Management Entity (MME) a control message to request for changing a traffic path that is established with the WLAN through the base station.

In accordance with another aspect of the present invention, a signal communication method of a terminal in a mobile communication system includes transmitting to a packet data network gateway (P-GW) a first control message including an indicator indicating whether the terminal supports network-based IP flow mobility (NB IFOM), receiving a response message including Wireless Local area Network (WLAN) control information for supporting the NB IFOM from the P-GW in response to the first message, and attempting PDN connection via a base station and a WLAN based on the response message.

In accordance with another aspect of the present invention, a terminal of a mobile communication system includes a transceiver for transmitting/receiving signals and a control unit which controls the transceiver to establish connections to a base station and a Wireless Local area Network (WLAN) for access to a PDN, detect that a WLAN connection is unusable, and transmit to a mobility management entity (MME) a control message to request for changing a traffic path which is established with the WLAN through the base station.

In accordance with still another aspect of the present invention, a terminal of a mobile communication system includes a transceiver for transmitting/receiving signals and a control unit which controls the transceiver to transmit to a Packet Data Network gateway (P-GW) a first control message including an indicator indicating whether the terminal supports network-based IP flow mobility (NB IFOM), receive a response message including Wireless Local area Network (WLAN) control information for supporting the NB IFOM from the P-GW in response to the first message, and attempt PDN connection via a base station and a WLAN based on the response message.

Advantageous Effects of Invention

The data communication method and apparatus of the present invention is advantageous in terms of using constrained communication resources efficiently in such a way that a network controls the traffic data transmission path of a terminal capable of connecting to 3GPP and non-3GPP networks simultaneously and determines the transmission path according to the network condition and terminal state.

MODE FOR THE INVENTION

Figure 1:
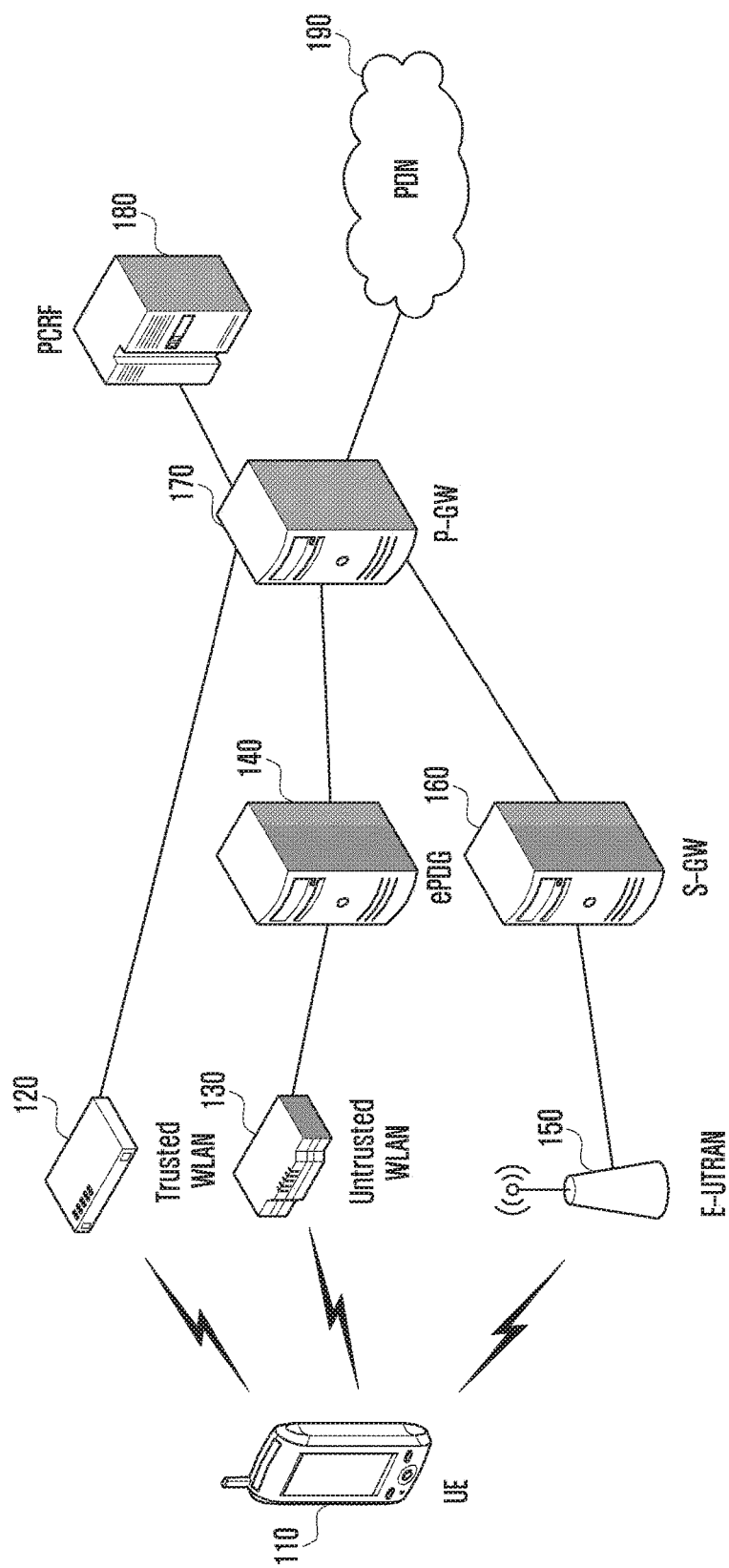
FIG. 1 is a schematic diagram illustrating a situation where a User Equipment (UE) communicates data simultaneously through a 3GPP access network and a non-3GPP access network according to an embodiment of the present invention.

Exemplary embodiments of the present invention are described with reference to the accompanying drawings in detail.

Detailed descriptions of well-known functions and structures incorporated herein may be omitted to avoid obscuring the subject matter of the present invention. This aims to omit unnecessary description so as to make clear the subject matter of the present invention.

For the same reason, some of the elements are exaggerated, omitted, or simplified in the drawings; and, in practice, the elements may have sizes and/or shapes different from those shown in the drawings. The same reference numbers are used throughout the drawings to refer to the same or like parts.

Advantages and features of the present invention and methods of accomplishing the same may be understood more readily by reference to the following detailed descriptions of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a non-transitory computer-readable memory that can direct a computer or other programmable data processing apparatus to function in a particular manner, such that the instructions stored in the non-transitory computer-readable memory produce an article of manufacture including instruction means that implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions/acts specified in the flowchart and/or block diagram block or blocks.

Furthermore, the respective block diagrams may illustrate parts of modules, segments, or codes including at least one or more executable instructions for performing specific logic function(s). Moreover, it should be noted that the functions of the blocks may be performed in a different order in several modifications. For example, two successive blocks may be performed substantially at the same time, or may be performed in reverse order according to their functions.

According to various embodiments of the present disclosure, the term "module", means, but is not limited to, a software or hardware component, such as FPGA and ASIC, which performs certain tasks. A module may advantageously be configured to reside on the addressable storage medium and may be configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more CPUs in a device or a secure multimedia card.

Although the present invention is directed to the 3GPP LTE system and the WLAN (or WiFi) as a non-3GPP access network, it will be understood by those skilled in the art that the present invention can be applied even to other communication systems having a similar technical background and channel format, with a slight modification, without departing from the spirit and scope of the present invention.

For example, the present invention can be applied to a 1x/CDMA2000 system or WiMAX system instead of WLAN.

FIG. 1 is a schematic diagram illustrating a situation where a User Equipment (UE) communicates data simultaneously through a 3GPP access network and a non-3GPP access network according to an embodiment of the present invention.

Although a WLAN is depicted as an example of the non-3GPP access network in FIG. 1, examples of the non-3GPP communication standard-based access network may include a 1x/CDMA2000/HRPD access network and a WiMAX network as well as the WLAN.

The non-3GPP access networks may include a trusted non-3GPP access network 120 and an untrusted non-3GPP access network 130. This categorization may be made depending on whether the non-3GPP access network connected to the operator's network is reliable. If the non-3GPP access network is unreliable (untrusted non-3GPP access network 130), it may connect to the 3GPP operator's network, e.g., P-GW 170, via an evolved Packet Data Gateway (ePDG). In an embodiment of the present invention, the operator may include an operator operating a 3GPP access network, and the non-3GPP access network may be the network operated by a service provider having a contract with the 3GPP operator.

It may also be possible for the trusted non-3GPP access network 120 to connect to the P-GW 170 directly without involvement of the ePDG.

Although the non-3GPP access networks 120 and 130 are depicted as independent devices for convenience of explanation in FIG. 1, each non-3GPP access network may be comprised of a plurality of access points. Particularly when the trusted non-3GPP access network is a WLAN, it may be called Trusted WLAN Access Network (TWAN) 120, which may include one or more WiFi access points and a Trusted WLAN Access Gateway (TWAG).

That is, the WiFi access points may connect to the 3GPP operator's network via the TWAG, which may be physically separated from the WiFi access points or implemented as a logical module in a device.

As shown in FIG. 1, the UE may use a Non-Seamless WLAN Offloading (NSWO) technology for communication with an external PDN (e.g., Internet) via the trusted WLAN 120 or the untrusted WLAN 130 without involvement of an operator's core network.

In an embodiment, the 3GPP mobile communication system, particularly an LTE system, may include an evolved Node B (E-UTRAN, eNB, or Node B) 150 and a Serving Gateway (S-GW), and the UE 110 may connect to an external network via the eNB 150, the S-GW 160, and the P-GW 170. The P-GW includes a Policy and Charging Enforcement Function (PCEF); and, if the PCEF is separated from the P-GW, the P-GW may be replaced by the PCEF in an embodiment of the present invention. Throughout the specification, an entity referred to as base station may be represented by the eNB 150 and may be capable of being connected to a cellular network.

The Policy and Charging Rules Function (PCRF) 180 may be a device for controlling the policy concerning the service quality (QoS) for the user and the Policy and Charging Control (PCC) rule is delivered to the P-GW 170.

The eNB 150 is a Radio Access Network (RAN) node responsible for the functions of a Radio Network Controller (RNC) of a UTRAN system and a Base Station Controller (BSC) of a GERAN system. The UE 110 connects to the eNB 150 through a radio channel, and the eNB 150 takes charge of the functions of the legacy RNC/BSC. The eNB 150 may consist of multiple cells. The methods according to the embodiments of the present invention may be applied to legacy 2G/3G networks by replacing the eNB (E-UTRAN) 150 with a UTRAN or GERAN.

The S-GW 160 is an entity responsible for handling data bearers so as to generate or delete data bearer context under the control of the Mobility Management Entity (MME). The S-GW 160 may be responsible for the functions of a Serving GPRS Support Node (SGSN) of the legacy 2G/3G network.

In the wireless communication system such as an LTE system, the QoS is applied in unit of EPS bearer. An EPS bearer is used for IP flows having the same QoS requirements. The EPS bearer may include QoS-related parameters such as QoS Class Identifier (QCI) and Allocation and Retention Priority (ARP).

In an embodiment, the EPS bearer may correspond to a PDP context of the GPRS system. In the case that the UE 110 connects to an Evolved Packet Core (EPC) via a 3GPP or non-3GPP access network, it establishes a PDN connection including one or more EPS bearers to which IP addresses are respectively designated. In the embodiment of the present invention, the term "PDN connection" or "connection" may be understood to have a meaning including a logical path capable of allowing a UE to communicate data with a PDN via a core network using IP addresses.

Figure 2:
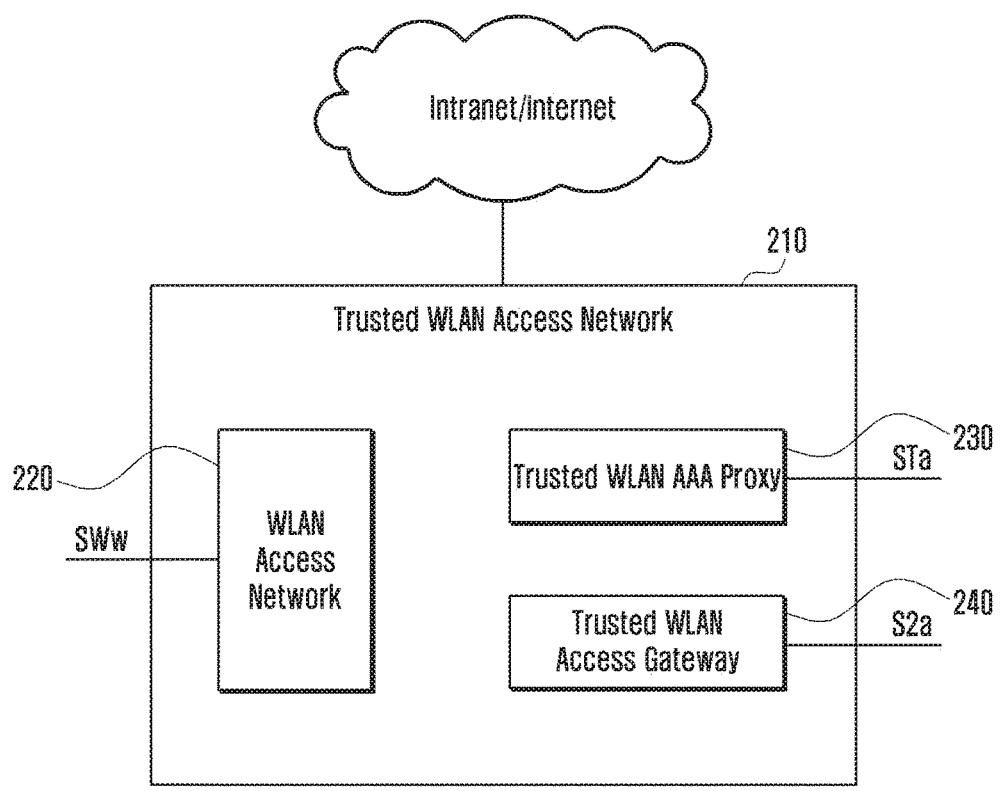
FIG. 2 is a block diagram illustrating a configuration of a Trusted WLAN Access Network (TWAN) (as a type of a trusted non-3GPP access network described with reference to FIG. 1) according to an embodiment of the present invention.

FIG. 2 is a block diagram illustrating a configuration of a Trusted WLAN Access Network (TWAN) (as a type of a trusted non-3GPP access network described with reference to FIG. 1) according to an embodiment of the present invention.

In reference to FIG. 2, the TWAN 210 may include a WLAN Access Network 220 comprised of one or more WLANs, a Trusted WLAN AAA Proxy 230 for interoperation with an AAA, and a Trusted WLAN Access Gateway (TWAG) 240 for connecting the WLAN Access network 210 and a P-GW (not shown).

The interface between the TWAG 240 and the P-GW may be called S2a and use a GPRS Tunneling Protocol (GTP) or a Proxy Mobile IP (PMIP) protocol. The above configuration is a logical configuration and not a physical configuration, which is more flexible to implement. According to an embodiment, the WLAN Access Network 220 and the TWAG 240 may be implemented as a physically identical entity.

Descriptions are made of the methods for a UE capable of connecting to the 3GPP and non-3GPP access networks to establish or manage the connections and of selecting one of the access networks for transmission based on the subscriber information and network condition according to an embodiment of the present invention. However, it is obvious to those skilled in the art that the present invention is not limited to the embodiments set forth herein and various modification and changes can be made thereto without departing from the broad sprit and scope of the invention.

Although the embodiments of the present invention are directed to the case where the system includes a TWAN as a non-3GPP access network for simplicity of explanation, the subject matter of the present invention may be applied to any situation for connection to a PDN via a non-3GPP access network. In the case where the operator's network is implemented with an Untrusted WLAN, the TWAN may be replaced by an ePDG which transmits/receives messages to/from the UE via the untrusted WLAN in an embodiment of the present invention.

According to an embodiment of the present invention, the IP flow control information may include IP flow identity information for use in identifying a certain IP flow such as Traffic Flow Templates (TFT), a packet filter, an IP flow descriptor, and a Service Data Flow (SDF) Template.

In the following description, the terms TWAN and WLAN may be interchangeably used for convenience of explanation. Also, the term WLAN may be referred to as an entity responsible for network control, e.g., WLAN Access Point, TWAG, and ePDG, for convenience of explanation. Although the description is directed to a case where a UE communicates with a TWAN as a network entity for simplicity of explanation, the network entity communicating with the UE through a protocol for exchanging messages may be at least one entity included in the TWAN (i.e., WLAN access network, TWAG, TWAP). For example, a beacon message may be transmitted by a WLAN access network in the TWAN. An Access Network Query Protocol (ANQP) method may be applied between the UE and a WLAN access network in the TWAN, an ANQP server connected thereto, and a TWAG. WLAN Control Protocol (WLCP) layer messages may be exchanged between the UE and the TWAG.

If the non-3GPP access network is untrusted, the information being exchanged between the UE and the ePDG may be delivered in an Internet Key Exchange (IKE) message rather than a WLAN control Protocol layer message through the non-3GPP access network. For direct information exchange between the UE and the WLAN access network, an EAP message may be used.

Although the information exchange between the WLAN and the PCRF is described in association with Gateway Control Session Establishment, Modification and Termination and the information exchange between the P-GW and PCRF is described in association with IP-CAN session Establishment, Modification, and Termination, the real procedure may be performed in such a way that the WLAN or P-GW sends the PCRF a Credit Control Request (CCR) message including the information described in the embodiments and the PCRF sends the WLAN or P-GW a Credit Control Answer (CCA) message including the information described in the embodiments. If the PCRF sends the WLAN or P-GW the information described in the embodiments of the present invention in the state of no receipt of the request message, this case corresponds to the PCRF transmits to the WLAN or P-GW a Re-Auth (RA) Request message including the information described in the embodiments; thus, in reply the WLAN or P-GW transmits to the PCRF a Re-Auth (RA) Answer message including the information described in the embodiments. In the embodiments of the present invention, a diameter message is not limited by the above description and may be modified into a similar request/response message, and the subject matter of the present invention is to deliver the information described in the embodiments of the present invention from one entity to another for the operations described in the embodiments of the present invention.

Although the description is basically directed to a case where the UE uses an IP address allocated for the non-3GPP and 3GPP access networks as described above, the subject matter of the present invention may be applicable to the case of using different IP addresses allocated for use in the non-3GPP and 3GPP networks under the assumption that the networks are connected to the same P-GW and the information being exchanged between the UE and the respective network entities may include identifiers of the entities involved in the corresponding operation (e.g., IP address, connection identifier, and basic bearer identifier).

In any of the embodiments of the present invention, the S-GW may be excluded during a message exchange procedure. In the case that a network entity, particularly MME, exchanges messages with the P-GW, these messages may be relayed via the S-GW therebetween. That is, the S-GW may relay the control message received from the MME to the P-GW and the control message received from the P-GW to the MME and, in this case, the information (Information Element) included in the GTP message generated by the S-GW for relaying to the next hop may be the information received from the previous hop. A description is made of the method for determining a connection and traffic path when the UE is capable of connecting to a 3GPP access network and a non-3GPP access network such as WLAN according to an embodiment of the present invention.

Figure 3:
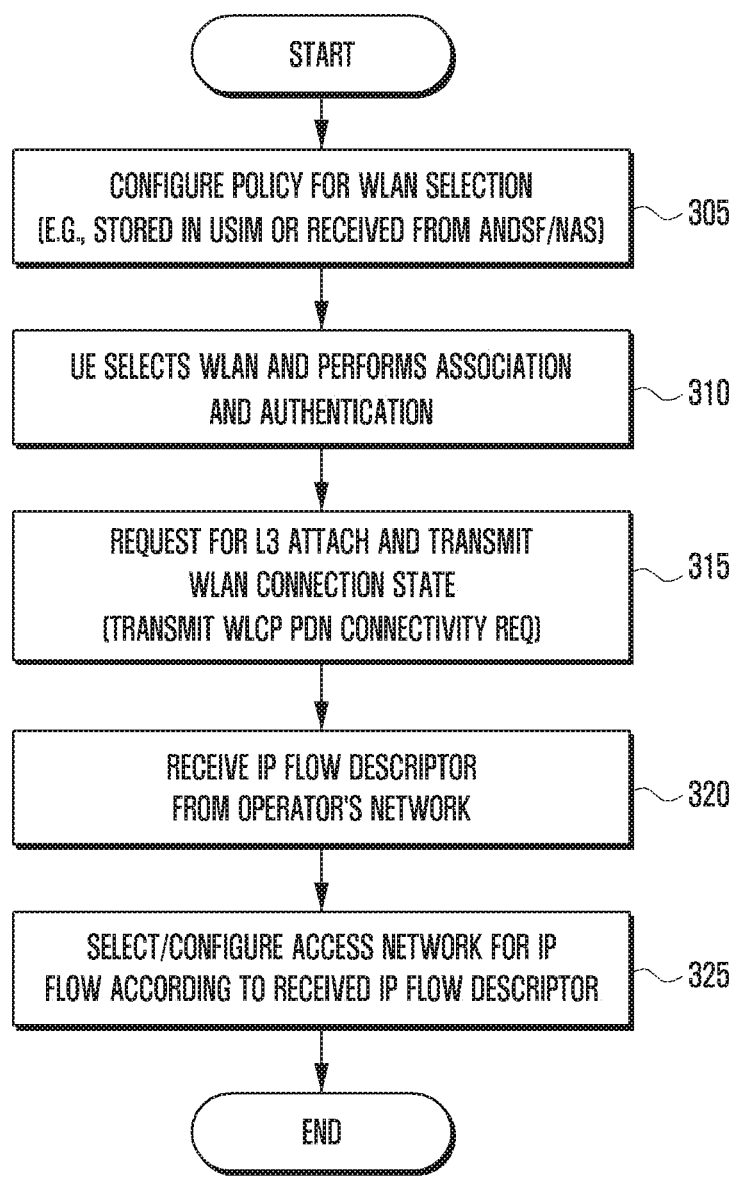
FIG. 3 is a flowchart illustrating UE operations according to an embodiment of the present invention.

FIG. 3 is a flowchart illustrating UE operations according to an embodiment of the present invention.

In reference to FIG. 3, the UE may select a WLAN for establishing a connection to an EPC.

The UE may have a policy for selecting an appropriate WLAN according to step 305, and the policy may be stored in the UE or received from an ANDS server, an MME of the operator's network (using a NAS message), or an eNB (using an RRC message).

The policy may include WLAN state report configuration stored in the UE. In an embodiment, the WLAN state report configuration may include at least one of a report target or event, a condition for triggering a report, a reporting interval, and other information necessary for WLAN operation. For example, it may be possible to configure the UE to make a report when the WLAN connection of the UE changes (i.e., connection establishment or termination or measured signal strength fulfilling a condition), the UE connects to a new WLAN, and when the WLAN to which the UE is connected enters a congestion state or recovers from the congestion state (caused by BSS load of beacons from APs, backhaul speed/load received through an ANQP procedure, or UE-measured average delay time).

The UE may select a WLAN and perform an association and authentication procedure according to the policy or a rule at step 310. According to an embodiment, the authentication procedure may be omitted or performed during the next connection establishment procedure.

After connecting to the WLAN, the UE may send the operator's network a connection establishment request message via the WLAN at step 315. According to an embodiment, the UE's access and connection establishment may be performed simultaneously. In an embodiment, the request message may include a Layer 3 (L3) attach message. In an embodiment, if the WLAN is a TWAN, the UE may send the TWAG a WLCP PDN connectivity request message to request for connection establishment or send the WLAN an EAP message to request for connection establishment. If the WLAN is an untrusted WLAN, the UE may send the ePDG an IKE message to request for connection establishment. This message may include at least one of a user identifier (IMSI or NAI), a target Access Point Name (APN), a connection type (attach or handover), and UE capability on whether the UE supports NW control-based IP flow mobility function.

If the connection request is accepted, the UE receives IP flow-specific control information by means of a control message at step 320. In an embodiment, the IP flow-specific control information may be referred to as IP flow descriptor. Here, the IP flow-specific control information may be generated in the form of a TFT or a packet filter and, in detail, may include IP flow identity information (source and destination IP addresses, source and destination ports, domain name, protocol type, and service application identifier) and access network (e.g., WLAN connection or 3GPP access connection) identity information for connections for IP flows).

If the information is received, the UE may transmit IP flows through the established connections at step 325 according to the received IP flow-specific control information. If the PDN connection is established via both the WLAN and 3GPP access network simultaneously, the UE may determine the access network for use in transmitting traffic based on the IP flow control information. According to an embodiment, the UE may select the access network for transmitting traffic based on a value indicated in the IP flow control information.

In an embodiment, the IP flow control information may include at least one of an IP flow-specific access network priority and an IP flow-specific access network selection condition, which may include at least one of time, location (geographical latitude/longitude, cell, and TA), and congestion state. In an embodiment, the UE may select an access network for IP flow transmission based on at least one of the priority and access network selection condition. The priority may be designated differently depending on the condition. In detail, the WLAN may have a high priority at a first location, and the 3GPP network may have a high priority at a second location. In the case that the condition is included, the UE may select the access network with the highest priority among the access networks capable of transmitting a specific IP flow and fulfilling the condition. If it fails to transmit traffic transmission through the access network with the highest priority because of a change of the network condition (e.g., if the WLAN with a high priority for the IP flow traffic is selected but the WLAN connection is disconnected), the UE may transmit the traffic through an access network with the next highest priority.

In an embodiment of the present invention, the IP flow control information received from the operator's network may be included in the form of a policy (the UE uses it as a condition for making a decision and does not notify the network of success or failure) or a command (the UE performs an operation according to the command and notifies the network of success or failure). In an embodiment, the IP flow descriptor being received from the operator's network may include a condition or rule for transmission through a 3GPP network or a condition or rule for transmission through a non-3GPP network.

In the case that the UE is connected to the 3GPP network and the WLAN, the UE may access the PDN via the 3GPP network or the WLAN with the same PDN context. It may also be possible to establish a connection per PDN context.

Figure 4:
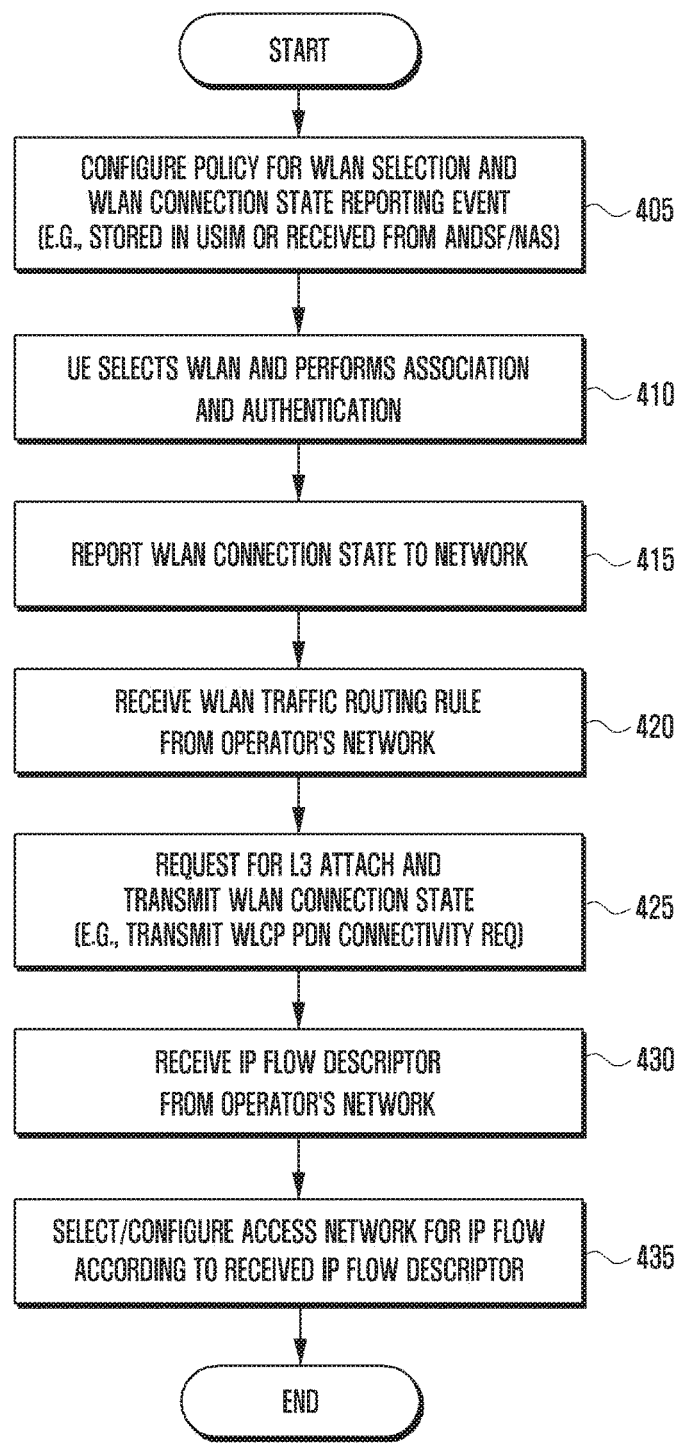
FIG. 4 is a flowchart illustrating UE operations according to an embodiment of the present invention.

FIG. 4 is a flowchart illustrating UE operations according to an embodiment of the present invention.

In reference to FIG. 4, the UE may select a WLAN for establishing a connection to the EPC via the WLAN at step 405. The operator's network may check the connection of the UE to the WLAN and network condition of the WLAN (congestion state of BSS or load state of the backhaul) to determine whether to use the WLAN for relaying the traffic. For this purpose, the UE may have a policy for selecting an appropriate WLAN and reporting WLAN connection status, and the policy may be stored in the UE or received from an ANDS server or an MME (using a NAS message) or an eNB (using an RRC message) of the operator's network.

The WLAN state reporting configuration information stored in the UE may include at least one of a reporting target, a reporting condition, or a reporting interval. For example, it may be configured to trigger reporting when the WLAN connection state of the UE changes, the received signal strength of the WLAN fulfils a predetermined condition, a new WLAN connection is detected, the congestion level (caused by BSS load of beacons from APs, backhaul speed/load received through an ANQP procedure, or UE-measured average delay time) of the WLAN to which the UE is connected is equal to or higher than a predetermined threshold value. The state reporting may be performed through a 3GPP network. In an embodiment, the operation of step 405 may include the operation of step 305.

The UE may select a WLAN and perform an association and authentication procedure according to the policy or a rule at step 410. Here, the authentication procedure may be omitted or performed during the next connection establishment procedure. In an embodiment, the operation of step 410 may include the operation of step 310.

If the procedure succeeds, the UE reports the WLAN connection state to the operator's network at step 415, and this reporting operation may be controlled according to the above described WLAN selection and reporting rule. In more detail, if the WLAN reporting rule is fulfilled, the UE may receive a rule (policy or configuration) for offloading the traffic from the operator's network to the WLAN at step 420.

The UE may send the operator's network a connection establishment request message via the connected WLAN at step 425. In an embodiment, the connection establishment request message may be transmitted when the UE has traffic configured to be relayed by the WLAN. Depending on the embodiment, the connection request may be made in the connection procedure.

In an embodiment, if the WLAN is a TWAN, the UE may send the TWAG a WLCP PDN connectivity request message to request for connection establishment or send the WLAN an EAP message to request for connection establishment. If the WLAN is an untrusted WLAN, the UE may send the ePDG an IKE message to request for connection establishment. This message may include at least one of a user identifier (IMSI or NAI), a target Access Point Name (APN), a connection type (attach or handover), and UE capability on whether the UE supports a NW control-based IP flow mobility function.

If the connection request is accepted, the UE receives IP flow-specific control information by means of a control message at step 430. This information may be received through the WLAN directly or the E-UTRAN in the form of a NAS message, an RRC message, or a Protocol Configuration Option (PCO). Here, the IP flow-specific control information may be generated in the form of a TFT or a packet filter and, in detail, may include IP flow identity information (source and destination IP addresses, source and destination ports, domain name, protocol type, and service application identifier) and access network (e.g., WLAN connection or 3GPP access connection) identity information for connections for IP flows).

If the information is received, the UE may transmit IP flows through the established connections according to the received IP flow-specific control information at step 435. If the PDN connection is established via both the WLAN and 3GPP access network simultaneously, the UE may determine the access network for use in transmitting traffic based on the IP flow control information. The IP flow control information may include at least one of an IP flow-specific access network priority and an IP flow-specific access network selection condition, which may include at least one of time, location (geographical latitude/longitude, cell, and TA), and congestion state. In the case that the condition is included, the UE may select the access network with the highest priority among the access networks capable of transmitting a specific IP flow and fulfilling the condition. If it fails to transmit traffic transmission through the access network with the highest priority because of a change of the network condition (e.g., if the WLAN with a high priority for the IP flow traffic is selected but the WLAN connection is disconnected), the UE may transmit the traffic through an access network with the next highest priority.

In an embodiment of the present invention, the IP flow control information received from the operator's network may be included in the form of a policy (the UE uses it as a condition for making a decision and does not notify the network of success or failure) or a command (the UE performs an operation according to the command and notifies the network of success or failure).

Figure 5:
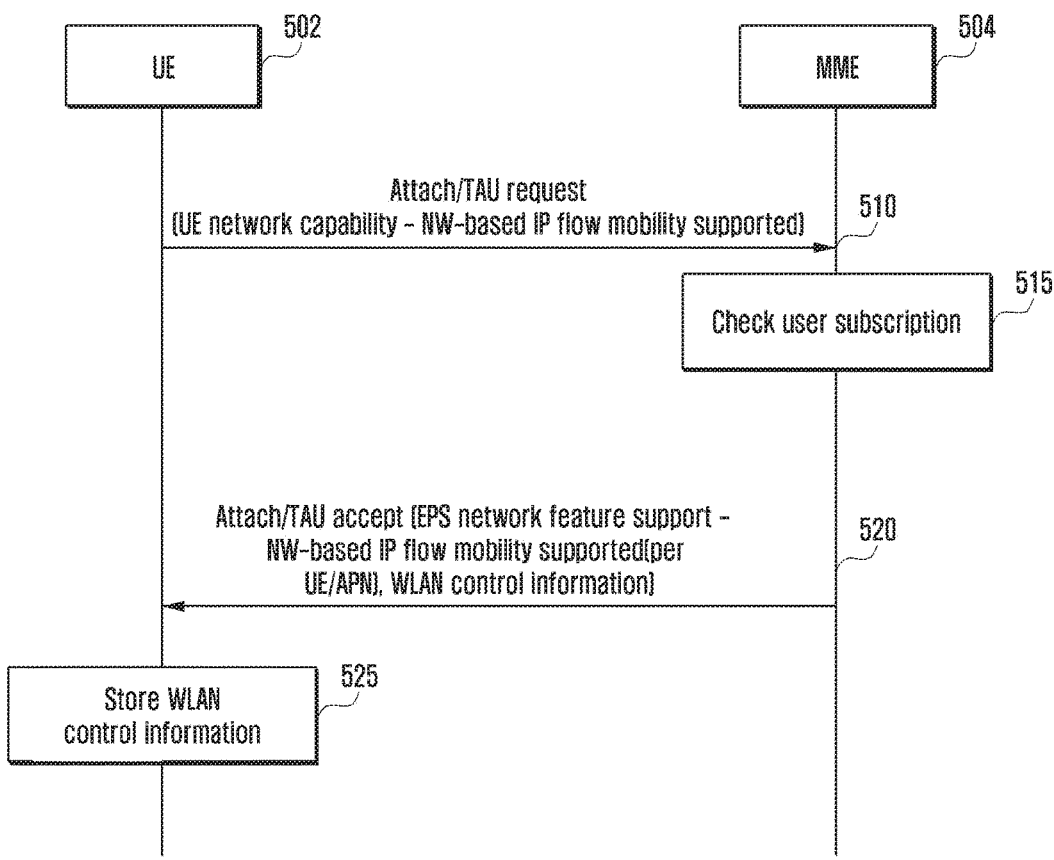
FIG. 5 is a signal flow diagram illustrating operations between a UE and a core network (e.g., MME) according to an embodiment of the present invention.

FIG. 5 is a signal flow diagram illustrating operations between a UE and a core network (e.g., MME) according to an embodiment of the present invention.

In reference to FIG. 5, the UE 502 and the MME 504 may exchange signals.

If a UE 502 having an NW-based IP flow mobility function is configured to use this function, it may transmit the information indicating its NW-based IP flow mobility capability to the core network including the MME 504 in an Attach or TA/RA update procedure at step 510. The NW-based IP flow mobility supportability information may be transmitted by means of an NW-based IP flow mobility supportability indicator in a UE network capability IE of an Attach or TA/RA update request message transmitted by the UE.

If the information transmitted by the UE is received, the core network (including MME 504) may check the subscriber information to determine whether to apply the NW-based IP flow mobility at step 515.

At this time, whether to apply the NW-based IP flow mobility may be configured per user, per APN, or per further smaller traffic unit (e.g., EPS bearer or IP flow with specific QCI).

The information transmitted by the core network 504 at step 520 may be delivered to the UE along with other WLAN control information e.g., WLAN selection/state reporting policy described in the previous embodiment, through a NAS accept message (Attach or TA/RA update accept). In an embodiment, the NAS accept message may include the information transmitted by the core network 504.

If the information transmitted by the core network 504 is received, the UE 502 may store the received information, at step 525, for use in WLAN selection/reporting and NW-based IP flow mobility operation.

Although the description is directed to the operations between the UE 502 and the MME 504 of the core network in the above embodiment, the subject matter of the embodiment may be applied to the operations between the UE and another network entity, e.g., WLAN, ePDG, and TWAG. If the above operations are performed between the UE and the WLAN, the messages may be replaced by EAP request and response messages in which the information type and position may be changed depending on the message format. Likewise, if the above operations are performed between the UE and the ePDG, the messages may be replaced by IKE request and response messages; if the above operations are performed between the UE and the TWAG, the messages may be replaced by WLCP request and response messages. If the operations are performed between the UE and the eNB, the messages may be replaced by RRC messages.

Figure 6:
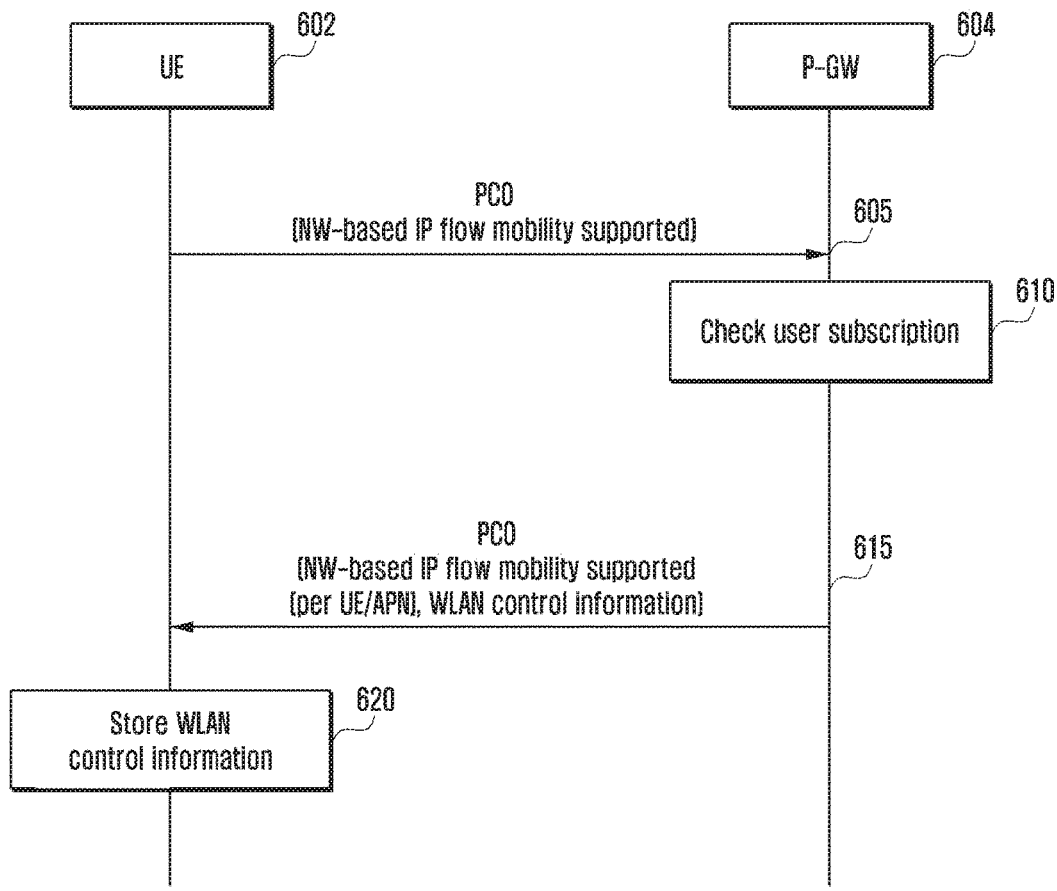
FIG. 6 is a signal flow diagram illustrating operations between a UE and a core network (e.g., P-GW) according to an embodiment of the present invention.

FIG. 6 is a signal flow diagram illustrating operations between a UE and a core network (e.g., P-GW) according to an embodiment of the present invention.

In reference to FIG. 6, the UE 602 and the P-GW 604 may exchange signals.

If a UE 602 having an NW-based IP flow mobility function is configured to use this function, it may transmit a request message including a Protocol Configuration Option having the information indicating its NW-based IP flow mobility capability to the core network (including P-GW 604) via an eNB at step 605.

If the message transmitted by the UE 602 is received, the core network 604 may receive and check user control information or subscriber information, e.g., rule from PCRF, at step 610 to determine whether to apply the NW-based IP flow mobility. At this time, whether to apply the NW-based IP flow mobility may be configured per user, per APN, or per further smaller traffic unit (e.g., EPS bearer or IP flow with specific QCI).

This information may be delivered, at step 615, along with other WLAN control information e.g., WLAN selection/state reporting policy described in the previous embodiment, to the UE 602 in a PCO of a NAS accept message (Attach or TA/RA update accept). The message carrying the above information may be changed depending on the embodiment.

If the control information is received, the UE 602 stores the information, at step 620, for use in WLAN selection/reporting and NW-based IP flow mobility operations.

In the above described embodiments, if the NW-based IP flow mobility capability information is received from the UE, the core network (e.g., MME and P-GW) may generate NW-based IP flow mobility control information based on the subscriber information.

Figure 7:
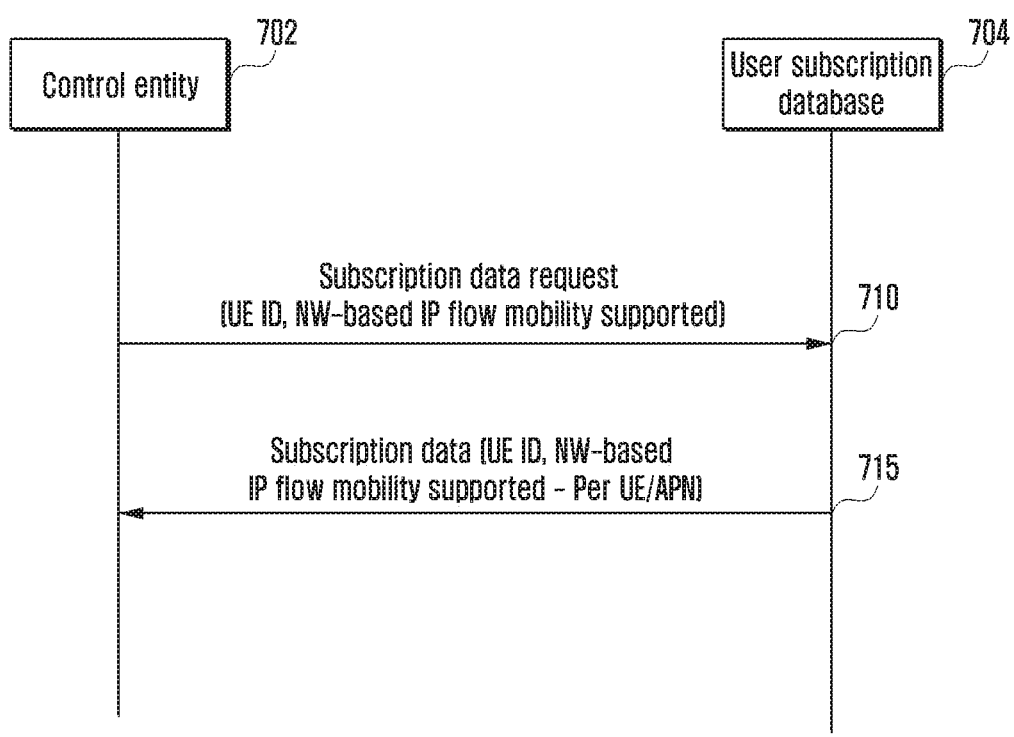
FIG. 7 is a signal flow diagram illustrating operations between a core network and a control information server (HSS/AAS) for generating NW-based IP flow mobility control information based on subscriber information.

FIG. 7 is a signal flow diagram illustrating operations between a core network and a control information server (HSS/AAS) for generating NW-based IP flow mobility control information based on subscriber information.

In reference to FIG. 7, the control node (Control Entity) 702 and the subscriber information server (User subscription database) 704 may exchange signals. In an embodiment, the control entity 702 may be a control node, e.g., at least one of MME, TWAG, P-GW, and PCRF of the core network. The user subscription database may be a node, e.g., at least one of HSS, AAA server, and Subscription Profile Repository (SPR), storing subscriber information.

The control node 702 may request to the user subscription data base 704 for subscriber information at step 710 if necessary. The subscriber information request message may include a WLAN offloading subscription information, i.e. NW-based IP flow mobility subscription information, as well as a UE ID.

If the information transmitted by the control node 702 is received, the subscriber information server 704 may transmit, at step 715, to the control node 702 the subscriber information concerning the UE which includes WLAN offloading subscription information for the case where the UE has such capability, i.e., at least one of the information indicating whether to apply WLAN offloading, the information whether to apply NW-based IP flow mobility, and service-specific application ranges (i.e., APN-specific or EPS-specific information).

Particularly when the UE is in the roaming state, the subscriber information server 704 may generate the subscriber information based on the whether a WLAN offloading contract, i.e., roaming contract concerning the NW-based IP flow mobility, exists between the visited network operator (operator of the control node requested for subscriber information) and the home network operator having the subscriber information. For this purpose, the roaming network and the home network may exchange the information on whether the UE is in a roaming state and the information on the HPLMN and serving PLMN.

Figure 8:
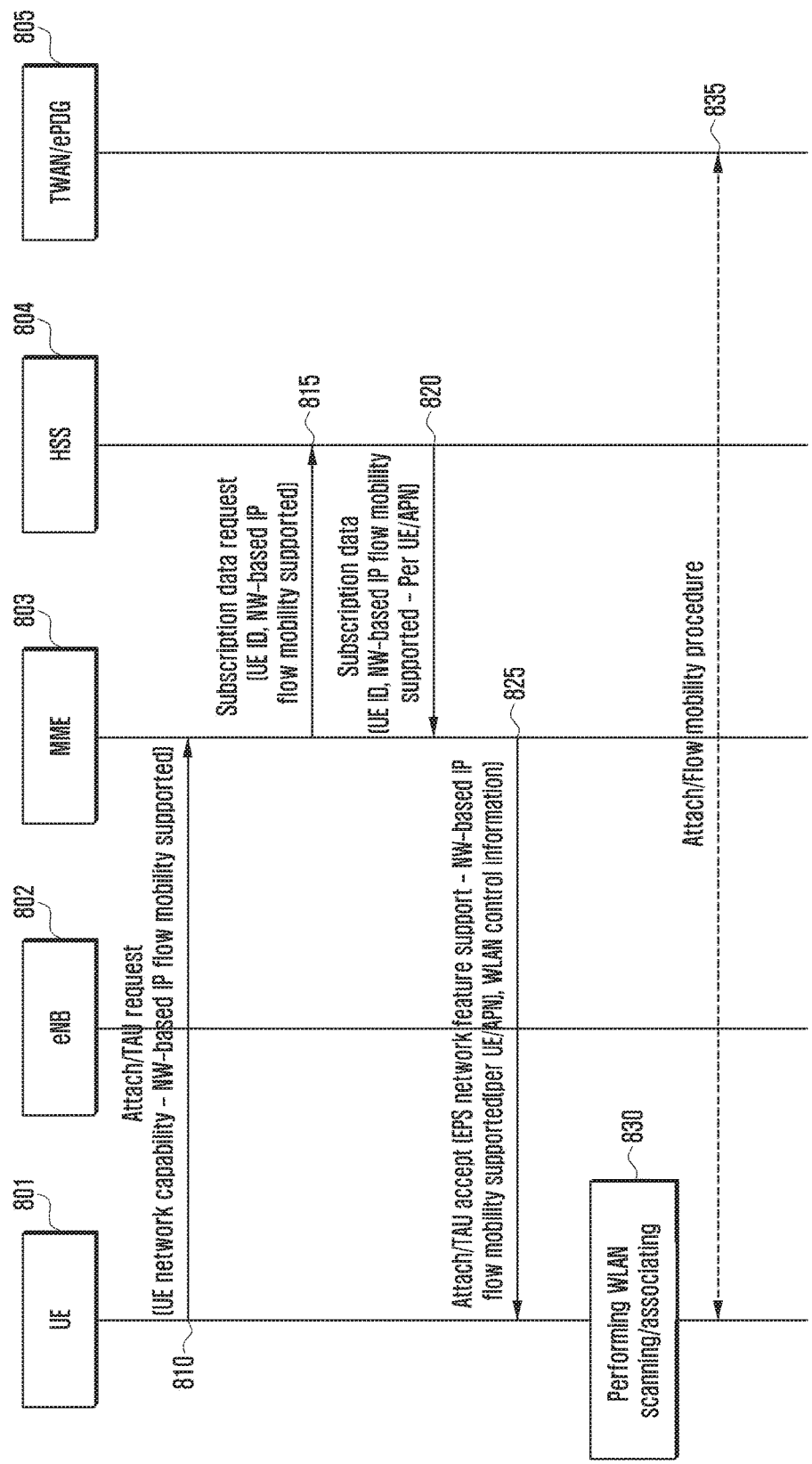
FIG. 8 is a signal flow diagram illustrating a procedure of negotiating WLAN offloading, particularly NW-based IP flow mobility control, between a UE and an operator's network according to an embodiment of the present invention.

FIG. 8 is a signal flow diagram illustrating a procedure of negotiating WLAN offloading, particularly NW-based IP flow mobility control, between a UE and an operator's network according to an embodiment of the present invention.

In reference to FIG. 8, signal exchange may occur between at least two of the entities, i.e., a UE 801, an eNB 802, an MME 803, an HSS 804, and a TWAN/ePDG 805. If the UE 801 supporting the NW-based IP flow mobility function is configured to use the corresponding function, it may notify the core network of its NW-based IP flow mobility capability via the eNB 802 at step 810. In detail, the UE 801 may notify the core network its NW-based IP flow mobility capability during the Attach or TA/RA update procedure. This capability information may be indicated by means of the NW-based IP flow mobility supportability indicator of a UE network capability IE of the Attach or TA/RA update request message transmitted by the UE 801.

If this capability information is received, the core network (MME 803) checks, at step 815, the subscriber information and determines whether to apply the NW-based IP flow mobility. In detail, the MME 803 may request to the HSS 804 for the subscriber information if necessary, and the subscriber information request message may include the UE ID and subscription information concerning WLAN offloading, i.e., at least one of the identifiers requesting for the NW-based IP flow mobility subscription information.

If the request is received, the HSS 804 provides the control node 803 with the subscriber information concerning the UE 801 which includes WLAN offloading subscription information for the case where the UE has the capability, i.e., at least one of the information indicating whether to apply WLAN offloading, the information whether to apply NW-based IP flow mobility, and service-specific application ranges (i.e., APN-specific or EPS-specific information) at step 820.

Particularly when the UE is in the roaming state, the HSS 804 may generate the subscriber information based on the whether a WLAN offloading contract, i.e., roaming contract concerning the NW-based IP flow mobility, exists between the visited network operator (operator of the control node requested for subscriber information) and the home network operator having the subscriber information. For this purpose, the roaming network and the home network may exchange the information on whether the UE is in a roaming state and the information on the HPLMN and serving PLMN.

At this time, whether to apply the NW-based IP flow mobility may be configured per user, per APN, or per further smaller traffic unit (e.g., EPS bearer or IP flow with specific QCI).

This information may be delivered to the UE 801 at step 825 along with other WLAN control information, e.g. WLAN selection/state reporting policy described in the previous embodiment, through a NAS accept message (Attach or TA/RA update accept).

The UE 801 may store the information for use in the WLAN selection/reporting and NW-based IP flow mobility operations at step 830.

If necessary, an attach or PDN connection establishment procedure may be performed via the WLAN 805 at step 835.

Although the above description is directed to the operations among the UE 801, the MME 803 of the core network, and the HSS 804, the subject matter of the embodiment may be applied to the operations between the UE 801 and other entities, e.g. WLAN, ePDG 805, and TWAG.

If the above operations are performed between the UE 801 and the WLAN, the messages may be replaced by EAP request and response messages in which the information type and position may be changed slightly depending on the message format. Likewise, if the above operations are performed between the UE and the ePDG, the messages may be replaced by IKE request and response messages; if the above operations are performed between the UE and the TWAG, the messages may be replaced by WLCP request and response messages. If the operations are performed in association with the WLAN, the HSS 804 may be replaced by an AAA server.

Figure 9:
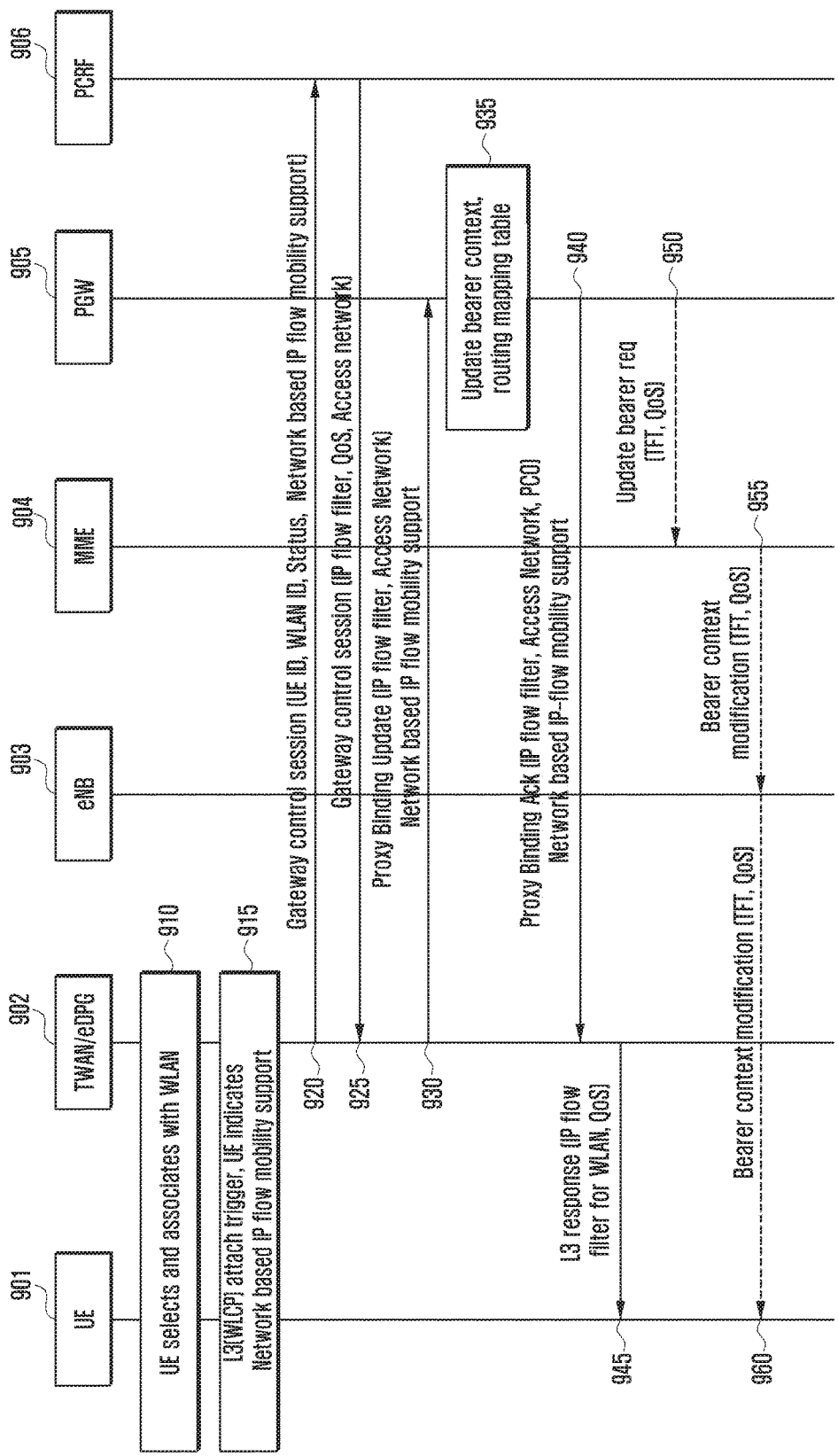
FIG. 9 is a signal flow diagram illustrating a traffic control information update procedure for a UE to establish a connection with a WLAN and relay traffic via the LTE and WLAN.

FIG. 9 is a signal flow diagram illustrating a traffic control information update procedure for a UE to establish a connection with a WLAN and relay traffic via the LTE and WLAN.

In reference to FIG. 9, signals are exchanged between at least two entities among a UE 901, a TWAN/eDPG 902, an eNB 903, an MME 904, a P-GW 905, and a PCRF 906.

The UE 901 may select the WLAN 902 to connect thereto (the UE may perform authentication selectively) at step 910 and transmits an attach request via the WLAN at step 915. At this time, the message carrying the attach request may be a WLCP message (in a multi-connectivity mode of a trusted WLAN), a DHCP message (in a case of being configured to use DHCP), an EAP message (in a single connectivity mode of a trusted WLAN), or an IKE message (in an untrusted WLAN). As described above, this message may include at least one of the information indicating whether the UE supports the NW-based IP flow mobility and the NW-based IP flow mobility information. In an embodiment, the information for updating the routing rule may be transmitted via the eNB 903.

Upon receipt of the connection (or attach) request message from the UE, the TWAN (in the case of a trusted WLAN) or the ePDG (in the case of an Untrusted WLAN) may request to the PCRF 906 for gateway control session establishment/modification if each entity can establish a connection (Gx interface) with the PCRF 906 at step 920. The request message may include at least one of an ID of the UE 901, WLAN ID and connection state, requested APN, and NW-based IP flow mobility supportability. The state information of the WLAN 902 may include the WLAN connection state of the UE 901 and the congestion state of the WLAN 902 to which the UE is connected (BSS load, number of connected stations, backhaul speed/load, and average delay). If the state information is received, the PCRF 906 may make an offloading decision for the UE 901 (i.e., whether to perform WLAN offloading and traffic to be transmitted via the WLAN) in consideration of the WLAN state information.

If the state information is received, the PCRF 906 may determine whether to provide the UE with the NW-based IP flow mobility service based on the subscriber information (received from an entity such as SPR) and transmit to the TWAN or ePDG 902 the information (hereinafter, referred to as IP flow control information) for use in selecting an access network per IP flow in consideration of the operator's network state (congestion state of the LTE network/congestion state of the WLAN) at step 925. This information may include IP flow identity information (packet filter) and an identifier of the access network allowing for the IP flow. This information may also include the IP flow identity information and application conditions (time, location, congestion state, etc.) and condition-specific access network priorities by introducing the concepts of access network selection condition and access network selection priority. This information may also include per-IP flow QoS information, e.g., traffic type (VoIP, Video, Best effort, etc.), maximum/minimum/guaranteed bitrates of uplink/downlink, QCI/ARP, and transmission parameters for use in WLAN, e.g., Access Category index.

The PCRF 906 may also transmit to the core network the information indicating whether the WLAN offloading is allowed per APN or Bearer for the UE 901.

If the IP flow control information, i.e. traffic routing information (information for use in determining the access network for use in relaying each IP flow) is received, the TWAN/ePDG 902 may transmit a Proxy Binding Update message to the P-GW 905 at step 930. The Proxy Binding Update message may include at least one of the IP flow control information and QoS information received from the PCRF 906 in addition to the basic information. The Proxy Binding Update message may include the WLAN state information. The WLAN state information may include the WLAN connection state of the UE 901 and the congestion state of the WLAN to which the UE 901 is connected (BSS load, number of connected stations, backhaul speed/load, and average delay time).

If this message is received, the P-GW 905 may use the WLAN state information contained in the message to make an offloading decision for the UE 901 (i.e., whether to perform WLAN offloading and the traffic to be transmitted to the WLAN).

The P-GW 905 may create/update the P-GW context for the UE based on the information received from the TWAN/ePDG 902 and select an access network for downlink data transmission per IP flow at step 935.

It may also be possible to determine the QoS parameters for controlling the traffic. If the PDN connection has already been established through the E-UTRAN, the P-GW 905 may update the routing table and bearer context (i.e., TFT or packet filter) of the E-UTRAN 903 per IP flow relayed by the E-UTRAN 903. The information being updated may include the access network priority per traffic, the information on the traffic relayed by the 3GPP network, and the information on whole or part of the traffic relayed by the non-3GPP network. It may also include the information concerning the IP filter.

The P-GW 905 transmits to the TWAN/ePDG 902 a Proxy Binding Ack message containing the information on the IP flow to be relayed by the WLAN at step 940 according to the determination made previously. If it is required to transmit the IP flow control information to the UE 901 using the PCO, the P-GW 905 transmits to the TWAN/ePDG the Proxy Binding Ack message including the IP flow control information, and the TWAN/ePDG 902 transmits the PCO part to the UE. If QoS control information is included, the TWAN/ePDG 902 may transmit the QoS control information to the WLAN to configure per-traffic transmission parameters.

The TWAN/ePDG 902 may deliver the IP flow control information received from the P-GW 905 to the UE 901 at step 945. Upon receipt of this information, the UE 901 may determine the IP flows to be relayed by the WLAN. If the QoS control information is included, the UE may configure the transmission parameters per IP flow.

In the case that a WLAN connection is established/terminated or the IP flow is switched from the E-UTRAN 903 to the WLAN because the IP flow is configured to be routed to the WLAN (i.e., if a situation occurs where part of IP flows should be or should not be relayed by the E-UTRAN 903 with priority), this situation may be controlled through the message exchange made previously between the TWAN/ePDG 902 and the UE. That is, if the IP flow control information destined for the UE 901 includes the information on the access network to be selected per traffic, the UE 901 may transmit the TFT or packet filter of the bearer being used in the E-UTRAN 903 to the NAS entity of the 3GPP modem to update the bearer context of the E-UTRAN along with updating the TFT or packet filter for the WLAN based on the information received from the TWAN/ePDG 902. In this case, in order to mitigate the TFT or packet filter processing load of the UE 901, the IP flow control information generated by the P-GW 905 and delivered to the UE may include the whole of the ESM message (e.g., Bearer Resource Modification Request) being used by the NAS in updating the TFT or packet filter or include simply the per-bearer TFTs or packet filters to be updated. In the case that the message carrying the IP flow control information received from the WLAN includes the ESM message, the UE may perform a 3GPP NAS processing on the ESM message and transfer the message to the control unit internally, and the 3GPP NAS control unit processes the ESM message; during this process, the 3GPP NAS layer context of the UE may change or an ESM response message or a new ESM request message may be generated and transmitted.

In the case that the above method is not applied, the P-GW 905 has to modify the bearer context, i.e. TFT or packet filter, of the E-UTRAN 903 and, for this purpose, a P-GW initiated bearer modification process may be performed. This process may be performed optionally through steps 950 and 960, and each message may include the TFT and QoS information.

If this procedure is completed, the P-GW 905 becomes aware of the access networks for relaying the respective downlink IP flows, and the UE 901 may select the access networks for the respective uplink IP flows. The UE may also become to know the QoS parameters to be applied for the traffic and thus determine transmission priorities of the access networks based thereon.

Although the embodiment of FIG. 9 is directed to the case where the WLAN and PCRF 906 interoperate, the P-GW 905, instead of the WLAN, may interoperate with the PCRF in a certain network.

Figure 10:
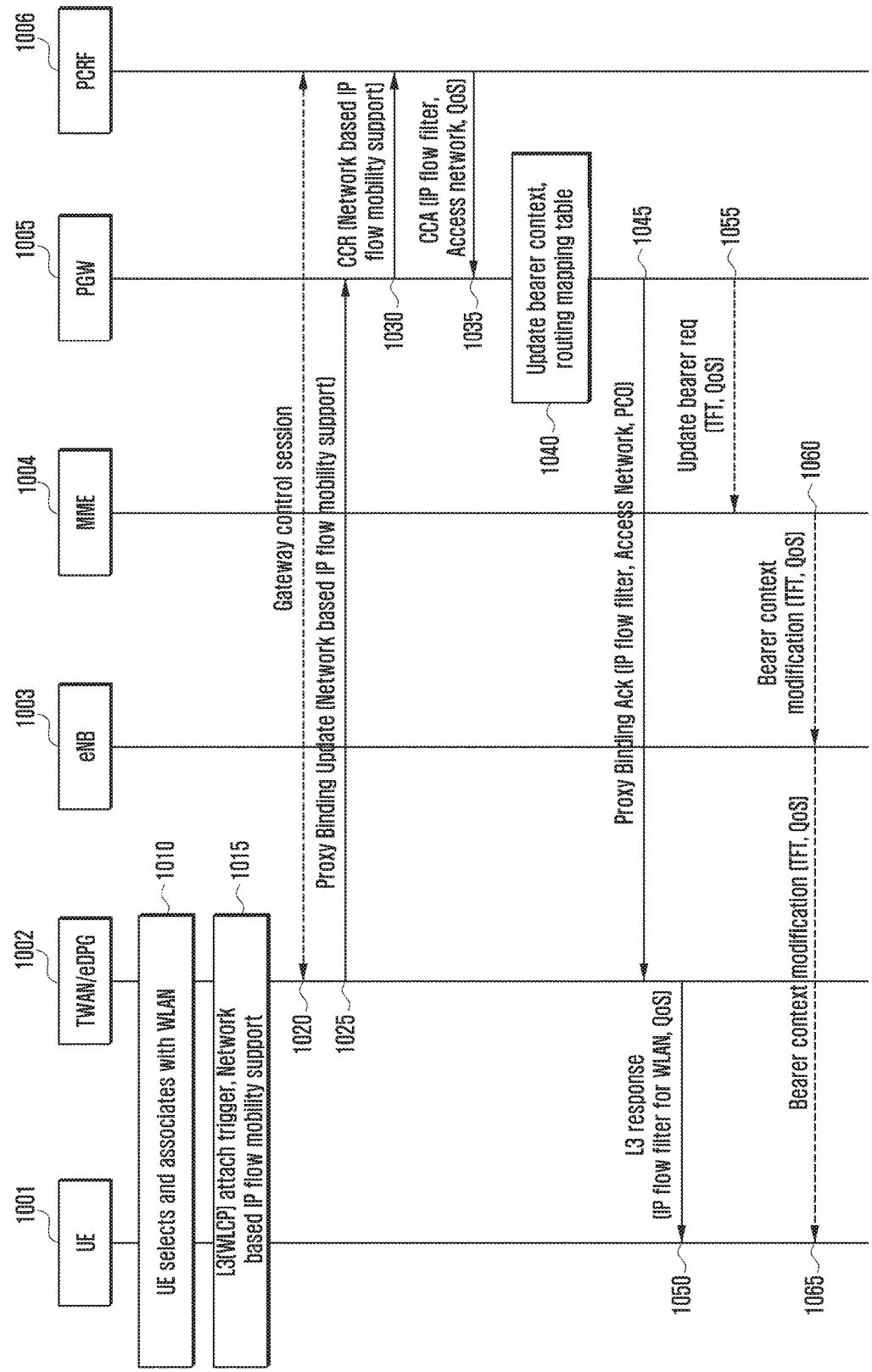
FIG. 10 is a signal flow diagram illustrating operations for supporting NW-based IP flow mobility in the case where a P-GW and a PCRF interoperate.

FIG. 10 is a signal flow diagram illustrating operations for supporting NW-based IP flow mobility in the case where a P-GW and a PCRF interoperate.

In reference to FIG. 10, signals are exchanged between at least two entities among a UE 1001, a TWAN/eDPG 1002, an eNB 1003, an MME 1004, a P-GW 1005, and a PCRF 1006.

The UE 1001 may select the WLAN 1002 and connects thereto (and may optionally perform authentication) at step 1010 and transmits an attach request via the WLAN 1002 at step 1015. At this time, a WLCP message (in a multi-connectivity mode of a trusted WLAN), a DHCP message (in a case of being configured to use DHCP), an EAP message (in a single connectivity mode of a trusted WLAN), or an IKE message (in an untrusted WLAN) may be used. As described above, the request message may include the NW-based IP flow mobility capability of the UE 1001.

In an embodiment, the gateway control session of step 1020 may not be performed or may optionally performed.

If a connection (or attach) request message is received from the UE, the TWAN (in the case of a trusted WLAN) or the ePDG (in the case of an Untrusted WLAN) may transmit a Proxy Binding Update message to the P-GW 1005 at step 1025. The Proxy Binding Update message may include the information indicating that the UE 1001 supports the NW-based IP flow mobility in addition to the basic information.

The Proxy Binding Update message may include the WLAN state information, which includes WLAN connection state of the UE and congestion state of the WLAN to which the UE is connected (BSS load, number of connected stations, backhaul speed/load, and average delay time). If this message is received, the P-GW 1005 may make an offloading decision for the UE 1001 (i.e., whether to perform WLAN offloading or traffic to be relayed by the WLAN) in consideration of the WLAN state information.

The P-GW 1005 may exchange the information with the PCRF 1006 through an IP-CAN session based on the information received from the TWAN/ePDG 1002 at step 1030. That is, if the P-GW 1005 has a Gx interface to the PCRF, it may transmit to the PCRF 1006 an IP-CAN session establishment request message including at least one of the ID of the UE 1001, WLAN ID and connection state, requested APN, and NW-based IP flow mobility capability. It may also be possible to transmit the WLAN state information received from the WLAN to the PCRF.

Upon receipt of the information, the PCRF 1006 may check that the UE 1001 supports the NW-based IP flow mobility and provide the P-GW 1005 with the information for use in selecting an access network per IP flow (hereinafter, referred to as IP flow control information) in consideration of the operator's network condition (congestion state of the LTE network, WLAN state received in the previous procedure, etc.) at step 1035. The information provided by the P-GW 1005 may include at least one of a packet filter for identifying the IP flow and an identifier for identifying the access network allowing for the IP flow. This information may also include the IP flow identity information and application conditions (time, location, congestion state, etc.) and condition-specific access network priorities by introducing the concepts of access network selection condition and access network selection priority. This information may also include per-IP flow QoS information, e.g., traffic type (VoIP, Video, Best effort, etc.), maximum/minimum/guaranteed bitrates of uplink/downlink, QCI/ARP, and transmission parameters for use in WLAN, e.g., Access Category index. Such information may be transferred in an extended form of the legacy Service Data Flow (SDF) template or a modified form thereof. The PCRF 1006 may transmit to the core network the information indicating whether WLAN offloading is allowed for the UE per APN or bearer.

The P-GW 1005 may create/update the P-GW context for the UE 1001, at step 1040, in consideration of the information received from the WLAN and the IP flow control information received from the PCRF 1006 if the IP flow control information has been generated, i.e., traffic routing information (information for use in determining the access network to relay the IP flow). In this way, the P-GW 1005 may determine the access network for relaying downlink data per IP flow. It may also be possible to determine QoS parameters to be applied for controlling traffic. If the same PDN connection has already been established via the E-UTRAN 1003, the P-GW 1005 may update the routing table and the bearer context (i.e., TFT or packet filter) of the E-UTRAN 1003 per IP flow to be relayed by the UTRAN 1003 based on the above information.

At step 1045, the P-GW 1005 transmits to the TWAN/ePDG 1002 a Proxy Binding Ack message including the information on the IP flow to be relayed by the WLAN according to the previous determination. If the IP flow control information should be delivered to the UE 1001 by means of PCO, the P-GW 1005 transmits to the TWAN/ePDG 1002 the Proxy Binding Ack message with the PCO containing the IP flow control information, and the TWAN/ePDG 1002 delivers the PCO part to the UE 1001 at step 1050. If the message includes QoS control information, the TWAN/ePDG 1002 may transmit the QoS control information to the WLAN to configure traffic-specific transmission parameters.

The TWAN/ePDG 1002 delivers the IP flow control information received from the P-GW 1005 to the UE 1001, which can check the IP flows relayed by the WLAN based on the IP flow control information. If QoS control information is included, the UE 1001 configures the transmission parameters for the traffic belonging to the IP flows based on the QoS control information. If the TWAN uses the WLCP, the TWAG may transmit to the UE a PDN connectivity accept message included the above information encoded in the TFT. At this time, the TFT may include at least one of the information for determining the access network per packet filter (e.g., allowed RAT type and per-RAT priority) and the condition for determination (time, location, congestion state, etc.) in the legacy format.

In the case that a WLAN connection is established/terminated or the IP flow is switched from the E-UTRAN 1003 to the WLAN because the IP flow is configured to be routed to the WLAN (i.e., if a situation occurs where part of IP flows should be or should not be relayed by the E-UTRAN 1003 with priority), this situation may be controlled through the message exchange made previously between the TWAN/ePDG 1002 and the UE. That is, if the IP flow control information destined for the UE includes the information on the access network to be selected per traffic, the UE may transmit the TFT or packet filter of the bearer being used in the E-UTRAN 1003 to the NAS entity of the 3GPP modem to update the bearer context of the E-UTRAN along with updating the TFT or packet filter for the WLAN based on the information received from the TWAN/ePDG 1002. In this case, in order to mitigate the TFT or packet filter processing load of the UE 1001, the IP flow control information generated by the P-GW 1005 and delivered to the UE may include the whole of the ESM message (e.g., Bearer Resource Modification Request) being used by the NAS in updating the TFT or packet filter or include simply the per-bearer TFTs or packet filters to be updated. In the case that the message carrying the IP flow control information received from the WLAN includes the ESM message, the UE may perform a 3GPP NAS processing on the ESM message and transfer the message to the control unit internally, and the 3GPP NAS control unit processes the ESM message; during this process, the 3GPP NAS layer context of the UE may change or an ESM response message or a new ESM request message may be generated and transmitted.

In the case that the above method is not applied, the P-GW 1005 has to modify the bearer context, i.e. TFT or packet filter, of the E-UTRAN 1003 and, for this purpose, a P-GW initiated bearer modification process may be performed. This process may be performed through steps 1055 and 1065 and, in an embodiment, optionally. The message may also include at least one of the TFT and QoS information.

If this procedure is completed, the P-GW 1005 becomes aware of the access networks for relaying the respective downlink IP flows, and the UE may select the access networks for transmitting the respective uplink IP flows. The UE may also become to know the QoS parameters to be applied for the traffic.

Although the embodiment of FIG. 10 is directed to the case of using the Proxy Mobile IP (PMIP) between the WLAN (TWAN/ePDG) and the P-GW, the WLAN may be connected to the P-GW through GTP in certain operators' networks.

Figure 11:
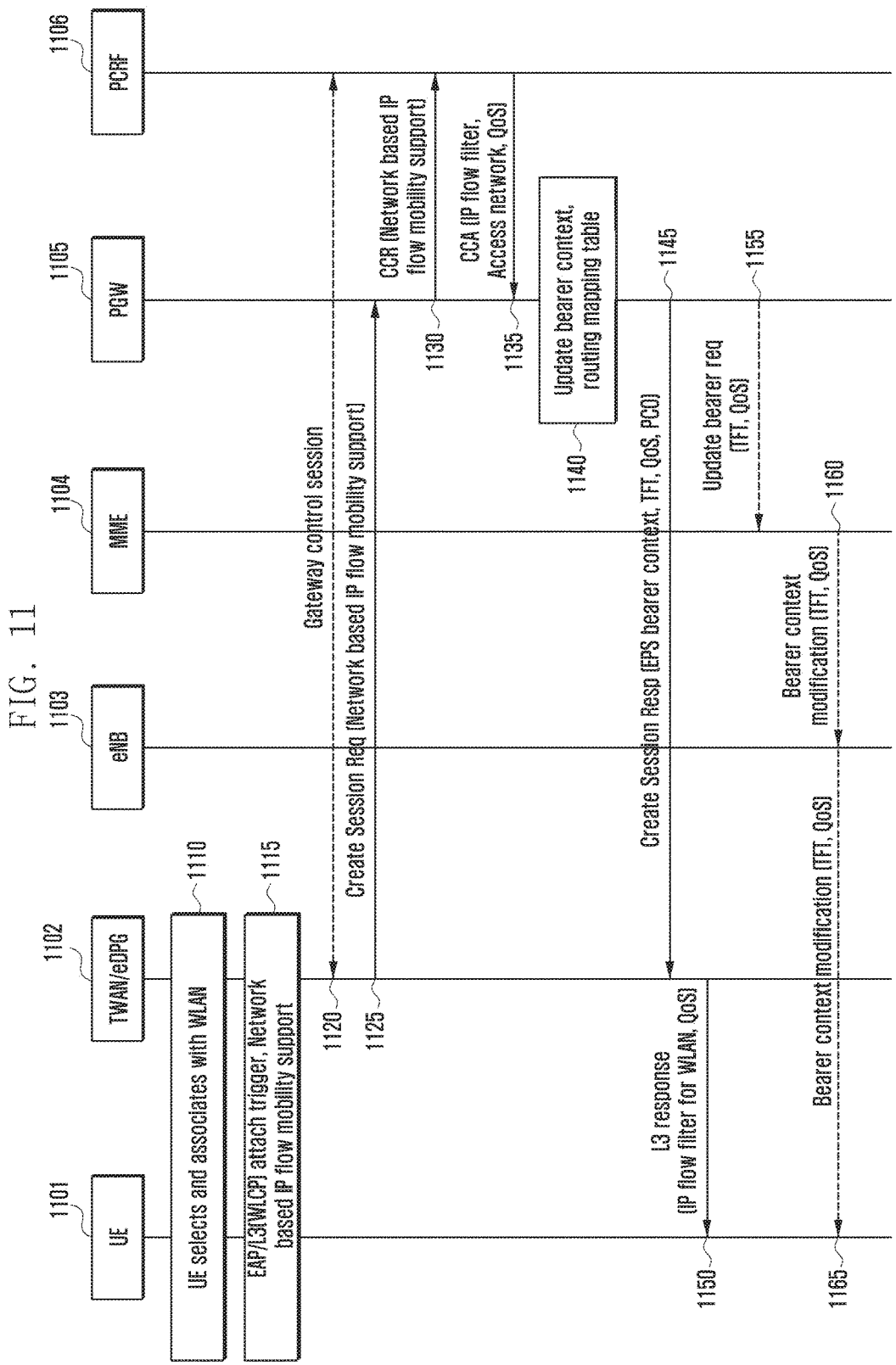
FIG. 11 is a signal flow diagram illustrating operations for supporting NW-based IP flow mobility with the interoperation between a P-GW and a PCRF according to an embodiment of the present invention.

FIG. 11 is a signal flow diagram illustrating operations for supporting NW-based IP flow mobility with the interoperation between a P-GW and a PCRF according to an embodiment of the present invention.

In reference to FIG. 11, signals may be exchanged between two entities among a UE 1101, a TWAN/eDPG 1102, an eNB 1103, an MME 1104, a P-GW 1105, and a PCRF 1106.

The UE selects the WLAN 1002 and connects thereto at step 1110 (and may optionally perform authentication) and transmits an attach request to the WLAN network 1102 at step 1115. At this time, the attach request message may be a WLCP message (in a multi-connectivity mode of a trusted WLAN), a DHCP message (in a case of being configured to use DHCP), an EAP message (in a single connectivity mode of a trusted WLAN), or an IKE message (in an untrusted WLAN). As described above, this message may include the NW-based IP flow mobility capability information of the UE 1101.

In an embodiment, a gateway control session may optionally be performed at step 1120.

If the connection (or attach) request message is received from the UE, the TWAN (in case of Trusted WLAN) or ePDG (in case of untrusted WLAN) may transmit a Create Session Request message to the P-GW 1105 at step 1125. The Create Session Request message may include the NW-based IP flow mobility capability information of the UE 1101 in addition to basic information.

The Create Session Request message may also carry WLAN state information including WLAN connection state of the UE and the congestion state of the WLAN 902 to which the UE is connected (BSS load, number of connected stations, backhaul speed/load, and average delay). If the WLAN state information is received, the PCRF 1106 may make an offloading decision for the UE 1101 (i.e., whether to perform WLAN offloading and traffic to be transmitted via the WLAN) in consideration of the WLAN state information.

The P-GW 1105 may exchange information through the IP-CAN session based on the information received from the TWAN/ePDG 1102 at step 1130. That is, if the P-GW 1005 has a Gx interface to the PCRF 1106, it may transmit to the PCRF 1106 an IP-CAN session establishment request message including at least one of the ID of the UE 1101, WLAN ID and connection state, requested APN, and NW-based IP flow mobility capability. It may also be possible for the P-GW to transmit the WLAN state information received from the WLAN to the PCRF.

Upon receipt of the information, the PCRF 1106 may check that the UE 1101 supports the NW-based IP flow mobility and then provide the P-GW 1105 with the information for use in selecting an access network per IP flow (hereinafter, referred to as IP flow control information) in consideration of the operator's network condition (congestion state of the LTE network, WLAN state received in the previous procedure, etc.) at step 1135. The information provided by the P-GW 1105 may include at least one of a packet filter for identifying the IP flow and an identifier for identifying the access network allowing for the IP flow. This information may also include the IP flow identity information and application conditions (time, location, congestion state, etc.) and condition-specific access network priorities by introducing the concepts of access network selection condition and access network selection priority. This information may also include per-IP flow QoS information, e.g., traffic type (VoIP, Video, Best effort, etc.), maximum/minimum/guaranteed bitrates of uplink/downlink, QCI/ARP, and transmission parameters for use in WLAN, e.g., Access Category index. Such information may be transferred in an extended form of the legacy Service Data Flow (SDF) template or a modified form thereof. The PCRF may transmit to the core network the information indicating whether WLAN offloading is allowed for the UE per APN or bearer.

The P-GW 1105 may create/update the P-GW context for the UE 1101, at step 1140, in consideration of the information received from the WLAN and the IP flow control information received from the PCRF 1106 if the IP flow control information has been generated, i.e., traffic routing information (information for use in determining the access network to relay the IP flow). In this way, the P-GW 1105 may determine the access network for relaying downlink data per IP flow. It may also be possible to determine QoS parameters to be applied for controlling traffic. If the same PDN connection has already been established via the E-UTRAN 1103, the P-GW 1105 may update the routing table and the bearer context (i.e., TFT or packet filter) of the E-UTRAN 1103 per IP flow to be relayed by the UTRAN 1103 based on the above information.

According to the determination made previously, the P-GW 1105 transmits to the TWAN/ePDG 1102 at step 1145 a Create Session Response message containing the information on the IP flows to be relayed by the WLAN. If the IP flow control information should be delivered to the UE 1101 by means of PCO, the P-GW 1105 transmits to the TWAN/ePDG 1102 the Proxy Binding Ack message with the PCO containing the IP flow control information, and the TWAN/ePDG 1102 delivers the PCO part to the UE 1101 at step 1150. If the message includes QoS control information, the TWAN/ePDG 1102 may transmit the QoS control information to the WLAN to configure traffic-specific transmission parameters.

The TWAN/ePDG 1102 delivers the IP flow control information received from the P-GW 1105 to the UE 1101, which can check the IP flows relayed by the WLAN based on the IP flow control information. If QoS control information is included, the UE 1101 configures the transmission parameters for the traffic belonging to the IP flows based on the QoS control information. If the TWAN uses the WLCP, the TWAG may transmit to the UE a PDN connectivity accept message including the above information encoded in the TFT. At this time, the TFT may include at least one of the information for determining the access network per packet filter (e.g., allowed RAT type and per-RAT priority) and the condition for determination (time, location, congestion state, etc.) in the legacy format.

In the case that a WLAN connection is established/terminated or the IP flow is switched from the E-UTRAN 1103 to the WLAN because the IP flow is configured to be routed to the WLAN (i.e., if a situation occurs where part of IP flows should be or should not be relayed by the E-UTRAN 1103 with priority), this situation may be controlled through the message exchange made previously between the TWAN/ePDG 1102 and the UE. That is, if the IP flow control information destined for the UE includes the information on the access network to be selected per traffic, the UE may transmit the TFT or packet filter of the bearer being used in the E-UTRAN 1103 to the NAS entity of the 3GPP modem to update the bearer context of the E-UTRAN along with updating the TFT or packet filter for the WLAN based on the information received from the TWAN/ePDG 1102. In this case, in order to mitigate the TFT or packet filter processing load of the UE 1101, the IP flow control information generated by the P-GW 1105 and delivered to the UE may include the whole of the ESM message (e.g., Bearer Resource Modification Request) being used by the NAS in updating the TFT or packet filter or include simply the per-bearer TFTs or packet filters to be updated. In the case that the message carrying the IP flow control information received from the WLAN includes the ESM message, the UE may perform a 3GPP NAS processing on the ESM message and transfer the message to the control unit internally, and the 3GPP NAS control unit processes the ESM message; during this process, the 3GPP NAS layer context of the UE may change or an ESM response message or a new ESM request message may be generated and transmitted.

In the case that the above method is not applied, the P-GW 1105 has to modify the bearer context, i.e. TFT or packet filter, of the E-UTRAN 1103 and, for this purpose, a P-GW initiated bearer modification process may be performed. This process may be performed through steps 1155 and 1165 and, in an embodiment, optionally. The message may also include at least one of the TFT and QoS information.

If this procedure is completed, the P-GW 1105 becomes aware of the access networks for relaying the respective downlink IP flows, and the UE may select the access networks for transmitting the respective uplink IP flows. The UE may also become to know the QoS parameters to be applied for the traffic.

In the case that the UE is connected to both the LTE and WLAN, it may become necessary to switch part of IP flows from one access network (e.g., LTE) to another (e.g., WLAN). It may also become necessary to switch an IP flow from one access network to another according to traffic occurrence or network condition.

Figure 12:
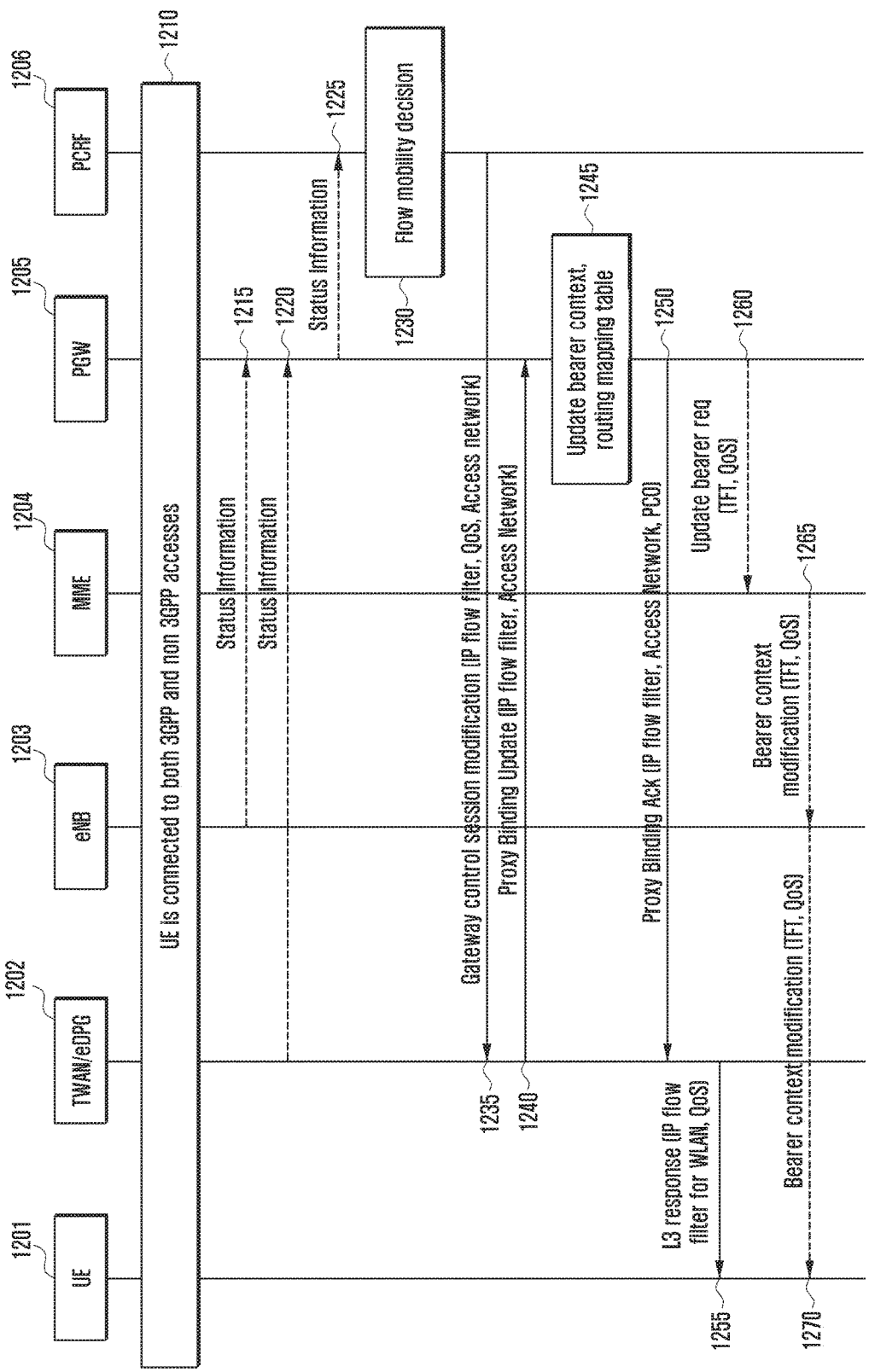
FIG. 12 is a signal flow diagram illustrating an IP flow control information update procedure for a case where a UE is connected to an LTE network and a WLAN simultaneously according to an embodiment of the present invention.

FIG. 12 is a signal flow diagram illustrating an IP flow control information update procedure for a case where a UE is connected to an LTE network and a WLAN simultaneously according to an embodiment of the present invention.

In reference to FIG. 12, signals may be exchanged between two entities among a UE 1201, a TWAN/eDPG 1202, an eNB 1203, an MME 1204, a P-GW 1205, and a PCRF 1206.

The UE 1201 has PDN connections via an E-UTRAN 1203 and a WLAN 1202 at step 1210. The PDN connections may be established simultaneously or successively. The procedure for establishing and managing a connection between the UE 1201 and the network may be performed as described in the previous embodiments.

At step 1225, the PCRF 1206 may receive the status information including the congestion state that is transmitted by the LTE eNB 1203 or the WLAN 1202. The PCRF 1206 may receive the information from a separate node that collects and reports congestion state information, e.g., a load manager, although being able to receive from the eNB 1203 at step 1215 or the WLAN node 1202 at step 1220.

The PCRF 1206 may check the type of traffic from the user and the network state change based on the received information to make a determination at step 1230 to switch the traffic from one access network to another. For example, if a user receives a report informing about LTE network congestion in the state of communicating an IP flow through the LTE network, the PCRF 1206 may switch the IP flow from the LTE network to a WLAN and increase the priority of the WLAN.

After making the IP flow control update decision, the PCRF 1206 may update the IP flow control information and transmit the updated information to the TWAN/ePDG 1202 at step 1235. In an embodiment, the updated control information may be transmitted through a Gateway Control Session Modification procedure or as part of the PCC rule or in the form of a separate WLAN offloading control rule. The PCRF 1206 may also update the information on WLAN offloading allowableness per APN or Bearer for the UE 1201 and transmit the updated information to the core network.

Upon receipt of the IP flow control information, the TWAN/ePDG 1202 may transmit to the P-GW 1205 a Proxy Binding Update message including the received information at step 1240. This message may carry the WLAN state information including WLAN connection state of the UE 1201 and the congestion state of the WLAN to which the UE is connected (BSS load, number of connected stations, backhaul speed/load, and average delay).

Upon receipt of the WLAN state information, the P-GW 1205 may make an offloading decision for the UE 1201 (i.e., whether to perform WLAN offloading and traffic to be transmitted via the WLAN) in consideration of the WLAN state information at step 1245.

Upon receipt of the IP flow control information, i.e. traffic routing information (information for use in determining the access network to relay each IP flow), the P-GW 1205 creates/updates the P-GW context concerning the UE based on the information received from the PCRF and stored in its storage and selects the access network to relay the downlink data per IP flow. It may also be possible to determine the QoS parameters to be applied for controlling the traffic. If the same PDN connection has already been established via the E-UTRAN 1203, the P-GW 1205 may update the routing table and the bearer context (i.e., TFT or packet filter) of the E-UTRAN 1203 per IP flow to be relayed by the UTRAN 1203 based on the above information.

According to the determination made previously, the P-GW 1205 transmits to the TWAN/ePDG 1202 at step 1250 a Proxy Binding Ack message containing the information on the IP flows to be relayed by the WLAN. If the IP flow control information should be delivered to the UE 1201 by means of PCO, the P-GW 1205 transmits to the TWAN/ePDG 1202 the Proxy Binding Ack message with the PCO containing the IP flow control information, and the TWAN/ePDG 1202 delivers the PCO part to the UE 1201 at step 1255. If the message includes QoS control information, the TWAN/ePDG 1202 may transmit the QoS control information to the WLAN to configure traffic-specific transmission parameters.

The TWAN/ePDG 1202 delivers the IP flow control information received from the P-GW 1205 to the UE 1201, which can check the IP flows relayed by the WLAN based on the IP flow control information. If QoS control information is included, the UE 1201 configures the transmission parameters for the traffic belonging to the IP flows based on the QoS control information. If the TWAN uses the WLCP, the TWAG may transmit to the UE a PDN connectivity accept message included the above information encoded in the TFT. At this time, the TFT may include at least one of the information for determining the access network per packet filter (e.g., allowed RAT type and per-RAT priority) and the condition for determination (time, location, congestion state, etc.) in the legacy format.

In the case that a WLAN connection is established/terminated or the IP flow is switched from the E-UTRAN 1203 to the WLAN because the IP flow is configured to be routed to the WLAN (i.e., if a situation occurs where part of IP flows should be or should not be relayed by the E-UTRAN 1203 with priority), this situation may be controlled through the message exchange made previously between the TWAN/ePDG 1202 and the UE. That is, if the IP flow control information destined for the UE includes the information on the access network to be selected per traffic, the UE may transmit the TFT or packet filter of the bearer being used in the E-UTRAN 1203 to the NAS entity of the 3GPP modem to update the bearer context of the E-UTRAN along with updating the TFT or packet filter for the WLAN based on the information received from the TWAN/ePDG 1202. In this case, in order to mitigate the TFT or packet filter processing load of the UE 1201, the IP flow control information generated by the P-GW 1205 and delivered to the UE may include the whole of the ESM message (e.g., Bearer Resource Modification Request) being used by the NAS in updating the TFT or packet filter or include simply the per-bearer TFTs or packet filters to be updated. In the case that the message carrying the IP flow control information received from the WLAN includes the ESM message, the UE may perform a 3GPP NAS processing on the ESM message and transfer the message to the control unit internally, and the 3GPP NAS control unit processes the ESM message; during this process, the 3GPP NAS layer context of the UE may change or an ESM response message or a new ESM request message may be generated and transmitted.

In the case that the above method is not applied, the P-GW 1205 has to modify the bearer context, i.e. TFT or packet filter, of the E-UTRAN 1203 and, for this purpose, a P-GW initiated bearer modification process may be performed. This process may be performed through steps 1260, 1265 and 1270 and, in an embodiment, optionally. The message may also include at least one of the TFT and QoS information.

If this procedure is completed, the P-GW 1205 becomes aware of the access networks for relaying the respective downlink IP flows, and the UE may select the access networks for transmitting the respective uplink IP flows. The UE may also become to know the QoS parameters to be applied for the traffic.

Figure 13:
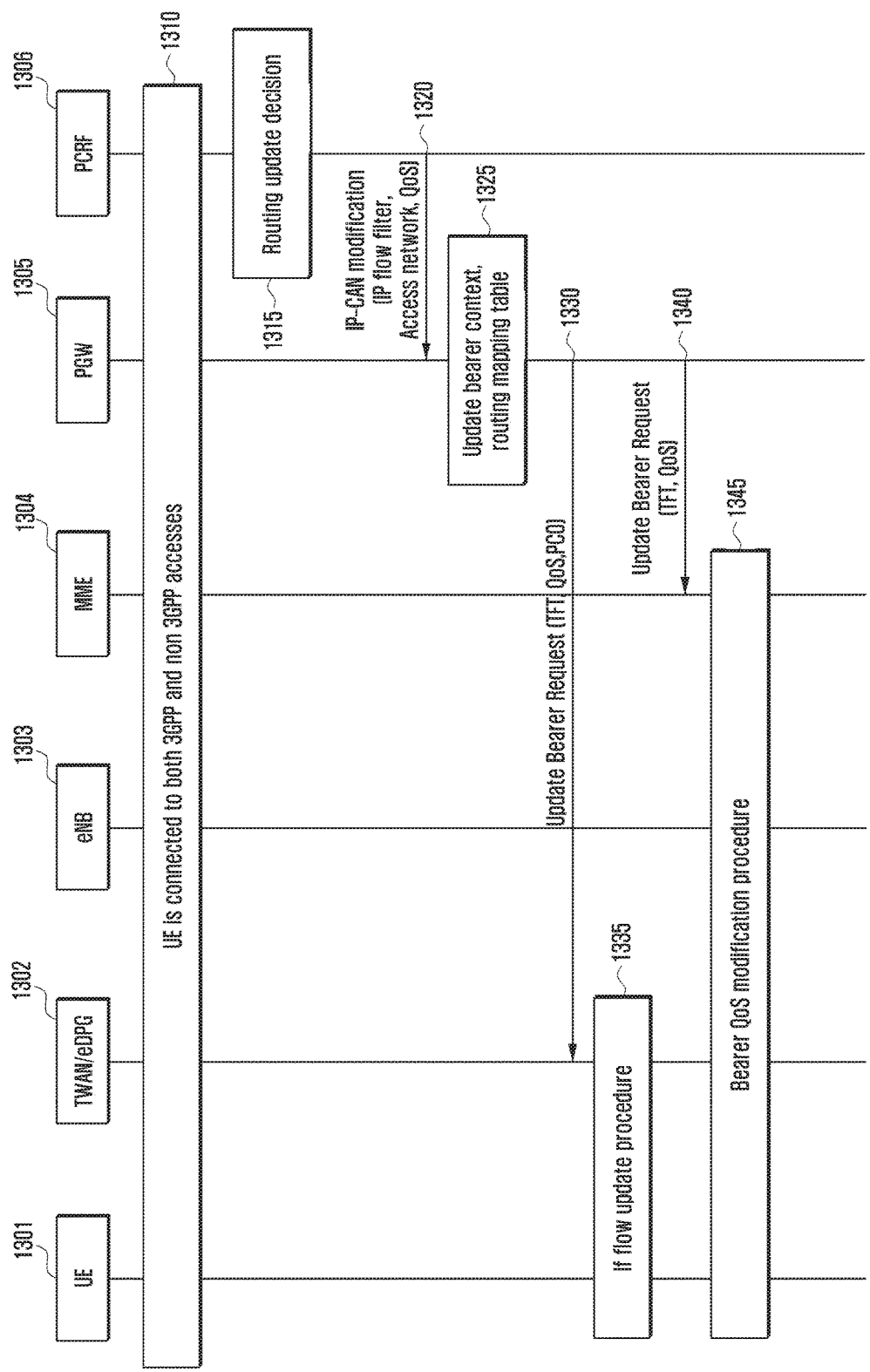
FIG. 13 is a signal flow diagram illustrating an IP flow control information update procedure for a case where a UE is connected to an LTE network and a WLAN simultaneously according to an embodiment of the present invention.

FIG. 13 is a signal flow diagram illustrating an IP flow control information update procedure for a case where a UE is connected to an LTE network and a WLAN simultaneously according to an embodiment of the present invention.

In reference to FIG. 13, signals may be exchanged between two entities among a UE 1301, a TWAN/eDPG 1302, an eNB 1303, an MME 1304, a P-GW 1305, and a PCRF 1306.

The UE 1301 has PDN connections via an E-UTRAN 1303 and a WLAN 1302 at step 1310. The PDN connections may be established simultaneously or successively. The procedure for establishing and managing a connection between the UE 1301 and the network may be performed as described in the previous embodiments.

In an embodiment, the PCRF 1306 or the P-GW 1305 may receive state information including congestion state from the LTE eNB 1303 or the WLAN 1302. The PCRF 1306 or the P-GW 1305 may receive the information from a separate node that collects and reports congestion state information, e.g., a load manager, although being able to receive from the eNB 1303 or the WLAN node 1302.

The PCRF 1306 may check the type of traffic from the user and the network state change to make a determination at step 1315 to switch the traffic from one access network to another. For example, if a user receives a report informing about bad signal state of the WLAN in the state of communicating an IP flow through the WLAN, the PCRF 1306 or the P-GW 1305 may switch the IP flow from the WLAN to an LTE network or increase the priority of the LTE.

After making the IP flow control update decision, the PCRF 1306 may update the IP flow control information and transmit the updated information to the P-GW 1305 at step 1320. For this purpose, an IP-CAN Session Modification procedure may be used, and the information may be transmitted as part of the PCC rule or in the form of separate information such as WLAN offloading control rule. The PCRF 1306 may also update the information on WLAN offloading allowableness per APN or Bearer for the UE 1301 and transmit the updated information to the core network.

The P-GW 1305 may create/update the P-GW context for the UE 1301, at step 1325, in consideration of the received congestion information and the IP flow control information received from the PCRF 1306 if the IP flow control information has been generated, i.e., traffic routing information (information for use in determining the access network to relay the IP flow). The P-GW 1305 may determine the access network for relaying downlink data per IP flow. It may also be possible to determine QoS parameters to be applied for controlling traffic. If the same PDN connection has already been established via the E-UTRAN 1303, the P-GW 1305 may update the routing table and the bearer context (i.e., TFT or packet filter) of the E-UTRAN 1303 per IP flow to be relayed by the UTRAN 1303 based on the above information.

According to the determination made previously, the P-GW 1305 may transmit to the TWAN/ePDG 1302 at step 1330 an Update Bearer Request message containing the information on the IP flows to be relayed by the WLAN. If the IP flow control information should be delivered to the UE 1301 by means of PCO, the P-GW 1305 transmits to the TWAN/ePDG 1302 the Proxy Binding Ack message with the PCO containing the IP flow control information, and the TWAN/ePDG 1302 delivers the PCO part to the UE 1301. If the message includes QoS control information, the TWAN/ePDG 1302 may transmit the QoS control information to the WLAN to configure traffic-specific transmission parameters.

At step 1335, the TWAN/ePDG 1302 delivers the IP flow control information received from the P-GW 1305 to the UE 1301, which can check the IP flows relayed by the WLAN based on the IP flow control information. If QoS control information is included, the UE 1301 configures the transmission parameters for the traffic belonging to the IP flows based on the QoS control information. If the TWAN uses the WLCP, the TWAG may transmit to the UE a PDN connectivity accept message including the above information encoded in the TFT. At this time, the TFT may include at least one of the information for determining the access network per packet filter (e.g., allowed RAT type and per-RAT priority) and the condition for determination (time, location, congestion state, etc.) in the legacy format.

In the case that a WLAN connection is established/terminated or the IP flow is switched from the E-UTRAN 1303 to the WLAN because the IP flow is configured to be routed to the WLAN (i.e., if a situation occurs where part of IP flows should be or should not be relayed by the E-UTRAN 1303 with priority), this situation may be controlled through the message exchange made previously between the TWAN/ePDG 1302 and the UE 1301. That is, if the IP flow control information destined for the UE 1301 includes the information on the access network to be selected per traffic, the UE 1301 may transmit the TFT or packet filter of the bearer being used in the E-UTRAN 1303 to the NAS entity of the 3GPP modem to update the bearer context of the E-UTRAN along with updating the TFT or packet filter for the WLAN based on the information received from the TWAN/ePDG 1302.

In this case, in order to mitigate the TFT or packet filter processing load of the UE 1301, the IP flow control information generated by the P-GW 1305 and delivered to the UE may include the whole of the ESM message (e.g., Bearer Resource Modification Request) being used by the NAS in updating the TFT or packet filter or include simply the per-bearer TFTs or packet filters to be updated. In the case that the message carrying the IP flow control information received from the WLAN includes the ESM message, the UE may perform a 3GPP NAS processing on the ESM message and transfer the message to the control unit internally, and the 3GPP NAS control unit processes the ESM message; during this process, the 3GPP NAS layer context of the UE may change or an ESM response message or a new ESM request message may be generated and transmitted.

In the case that the above method is not applied, the P-GW 1305 has to modify the bearer context, i.e. TFT or packet filter, of the E-UTRAN 1303 and, for this purpose, a P-GW initiated bearer modification process may be performed. This process may be performed through steps 1340 and 1345 and, in an embodiment, optionally. The message may also include at least one of the TFT and QoS information.

If this procedure is completed, the P-GW 1305 becomes aware of the access networks for relaying the respective downlink IP flows, and the UE may select the access networks for transmitting the respective uplink IP flows. The UE may also become to know the QoS parameters to be applied for the traffic.

Figure 14:
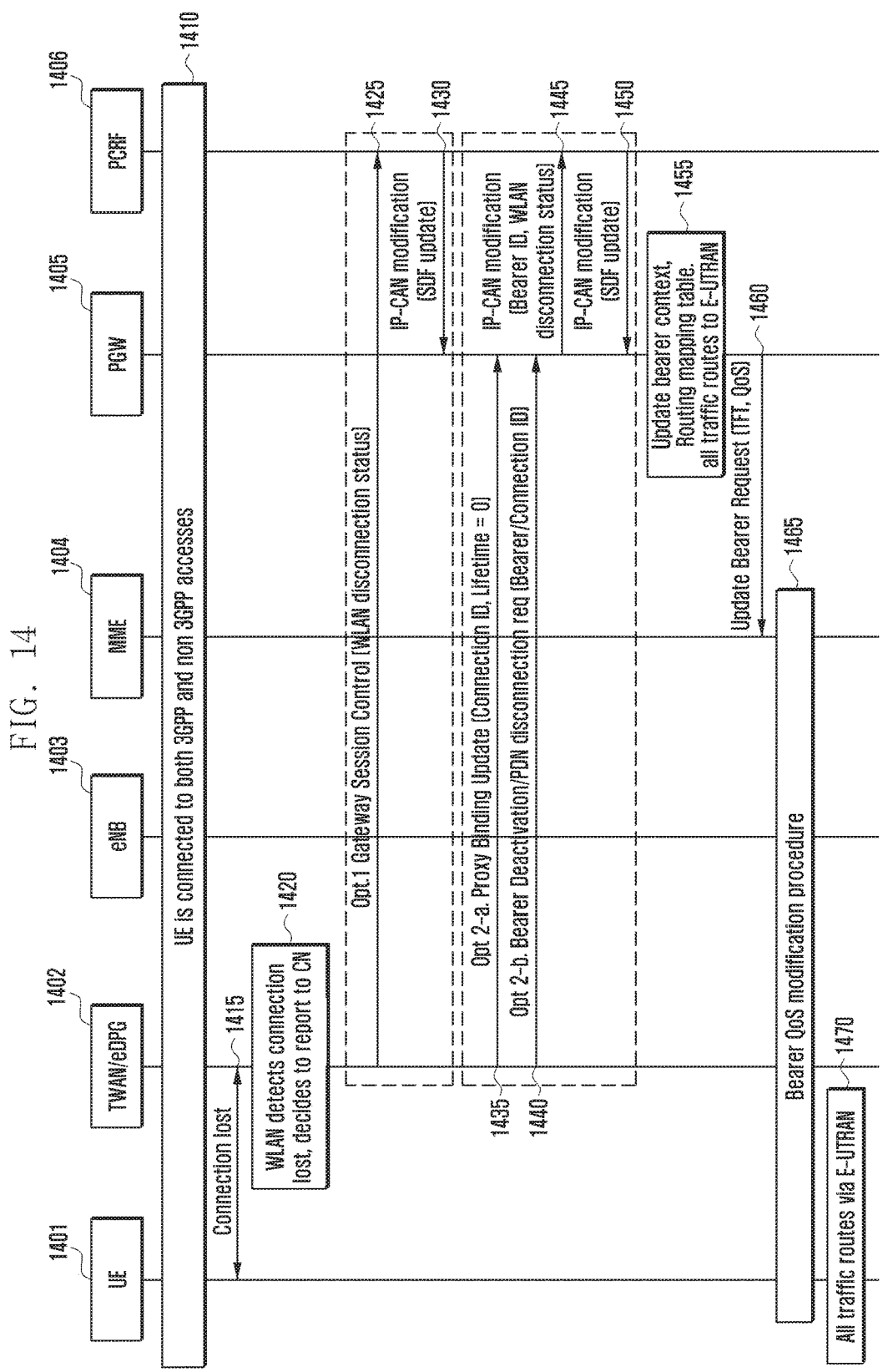
FIG. 14 is a signal flow diagram illustrating operations for a case of change of the connection state of a UE that is connected to an LTE network and a WLAN simultaneously according to an embodiment of the present invention.

FIG. 14 is a signal flow diagram illustrating operations for a case of change of the connection state of a UE that is connected to an LTE network and a WLAN simultaneously according to an embodiment of the present invention.

In reference to FIG. 14, signals may be exchanged between two entities among a UE 1401, a TWAN/eDPG 1402, an eNB 1403, an MME 1404, a P-GW 1405, and a PCRF 1406.

The UE 1401 has PDN connections via an E-UTRAN 1403 and a WLAN 1402 at step 1410. The PDN connections may be established simultaneously or successively. The procedure for establishing and managing a connection between the UE 1401 and the network may be performed as described in the previous embodiments.

The connection between the UE 1401 and the WLAN 1402 is disconnected at step 1415, and the WLAN (WLAN AP, TWAN, or ePDG) 1402 may detect the disconnection of the connection established with the UE 1401 at step 1420. In an embodiment, if the disconnection is detected, this means that there is no packet communication with the UE 1401 or there is no reply in response to a message transmitted by the WLAN during a predetermined period.

In an embodiment, the WLAN 1402 may notify the core network that the connection with the UE 1401 is terminated. This operation may be performed according to Option 1 or Option 2.

Option 1 is a method for use in the case where the WLAN 1402 can communicate signals with the PCRF 1406 directly such that the WLAN 1402 notifies the PCRF 1406 of the disconnection of the connection with the UE 1401 through a Gateway Control Session at step 1425.

Upon receipt of this notification, the PCRF 1406 may transmit to the P-GW 1405 at step 1430 the IP flow control information updated for transmitting all traffic through the LTE network.

In Option 2-a, as another method, the WLAN 1402 that uses the PMIP may notify the PCRF 1406 of the disconnection of the connection with the UE 1401 using the Proxy Binding Update message at step 1435. Here, this message may include a connection ID and Lifetime set to 0 to indicate that the connection is no longer valid.

In Option 2-b, as another method, the WLAN 1402 that uses the GTP may notify the PCRF 1406 at step 1440 of the disconnection of the connection with the UE 1401 using the Bearer Deactivation or PDN Disconnection Request message. This message may include the information for identifying the corresponding connection. This connection identity information may be one of WLAN connection ID, default bearer ID of the corresponding PDN connection, and a Linked Bearer ID. If the identifier indicates the bearer established through the E-UTRAN for the PDN connection, the core network may check the connection established via the WLAN 1402 using the bearer ID.

Upon receipt of one of these messages, the P-GW 1405 may transmit to the PCRF 1406, at step 1445, the information (at least one of connection termination information and connection/default bearer identifier) received through an IP-CAN session modification or termination procedure.

The PCRF 1406 may check the connection loss with the WLAN 1402 and transmit to the P-GW 1405 at step 1450 the IP flow control information updated for relaying all traffic through the LTE network.

Although not shown in the drawing, the PCRF may receive the information indicating change of the WLAN connection state of the UE or the change of a user's preferred WLAN signal from a server (e.g., IMP server) through an Rx interface.

The P-GW 1405 may perform a bearer context update procedure at step 1455 for relaying all traffic concerning the UE 1401 through the LTE network based on the information received from the WLAN 1402.

The P-GW 1405 at step 1460 transmits to an S-GW (not shown) an Update Bearer Request message including the TFT or packet filter configured for all IP flows to be relayed by the LTE network and, through this process, the IP flow control information, i.e. TFT or packet filter of the EPS bearer context, of the UE 1401 is updated such that the whole traffic is relayed by the LTE network. This operation may be performed through steps 1460 1465 and 1470, and the messages exchanged at these steps may include at least one of the TFT or QoS information.

Figure 15:
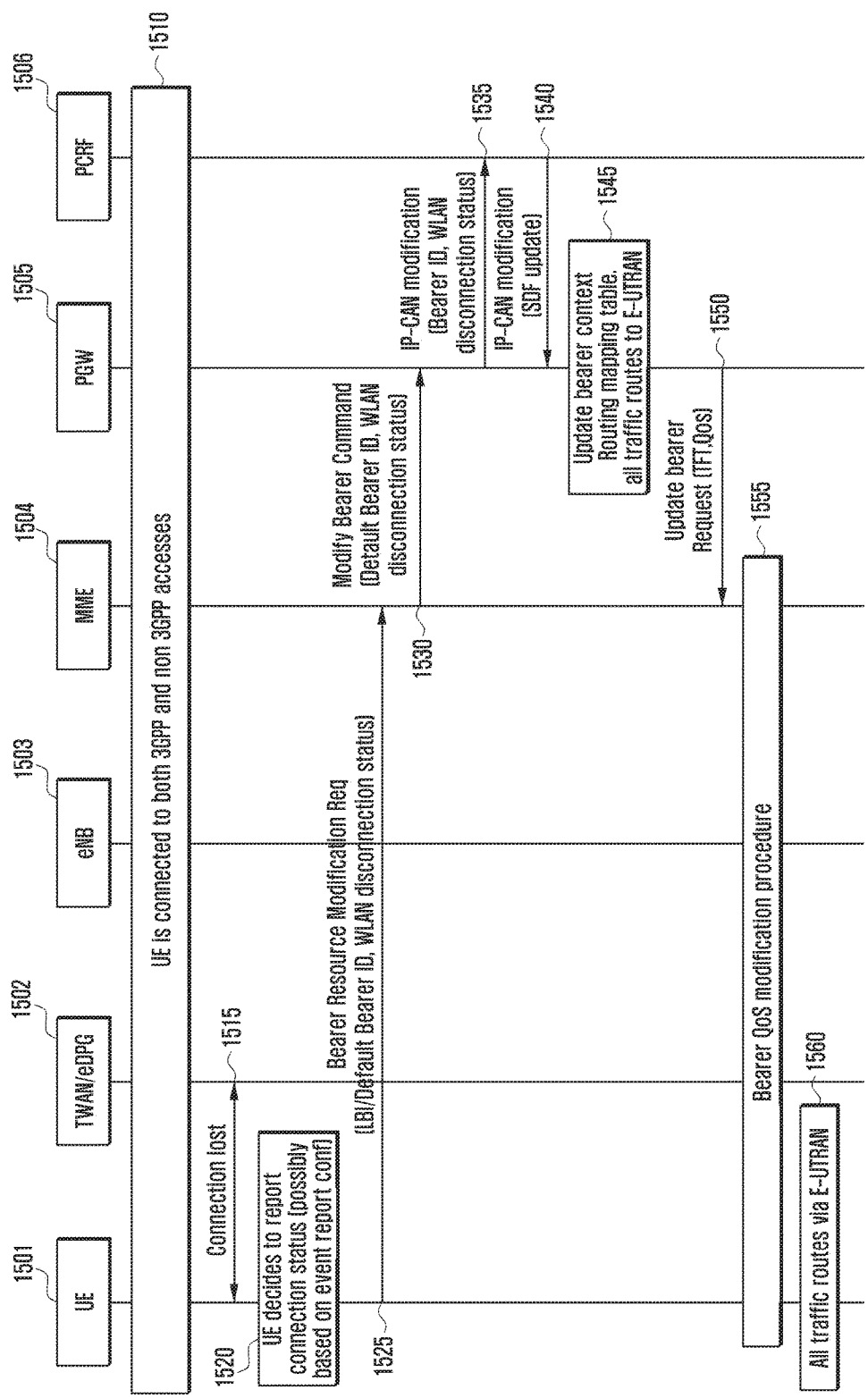
FIG. 15 is a signal flow diagram illustrating operations for a case where the connection state of the UE is such that it is connected to an LTE network and a WLAN simultaneously according to an embodiment of the present invention.

FIG. 15 is a signal flow diagram illustrating operations for a case where the connection state of the UE is that it is connected to an LTE network and a WLAN simultaneously according to an embodiment of the present invention.

In reference to FIG. 15, signals may be exchanged between two entities among a UE 1501, a TWAN/eDPG 1502, an eNB 1503, an MME 1504, a P-GW 1505, and a PCRF 1506.

The UE 1501 has PDN connections via an E-UTRAN 1503 and a WLAN 1502 at step 1510. The PDN connections may be established simultaneously or successively. The procedure for establishing and managing a connection between the UE 1501 and the network may be performed as described in the previous embodiments. In an embodiment, the UE may perform multi-access to the E-UTRAN 1503 and the WLAN 1502 to establish PDN connections to multiple IP flows.

The connection between the UE 1501 and the WLAN 1502 is disconnected at step 1515, and the UE 1501 may detect the disconnection of the connection established with the WLAN 1502 and determine at step 1520 whether to report this situation. If the disconnection is detected, this means that there is no packet communication with the WLAN 1502 or there is no reply in response to a message transmitted by the UE 1501 during a predetermined period. It may also be possible to judge the disconnection when the strength of a signal transmitted from the WLAN 1502 to the UE 1501 is equal to or less than a predetermined level.

The UE 150 may notify the core network of the disconnection of the connection with the WLAN 1502 at step 1525. This operation may be performed through a report control procedure configured previously to the UE as described in the above embodiment or through a separate event reporting message transmission procedure.

In detail, the UE 1501 may notify the core network of the WLAN connection loss by transmitting an RRC message to the eNB 1503 or a NAS message to the MME 1504. These messages may include at least one of the information indicating the WLAN connection loss and the connection identity information. In an embodiment, the WLAN connection loss information may include an indicator indicating that the WLAN connection cannot be used. In an embodiment, the connection identity information may be an ID of the connection established via the WLAN 1502, a default bearer ID of the corresponding PDN connection, or a Linked Bearer ID and, if the identifier indicates the bearer established through the E-UTRAN 1503 for the PDN connection, the core network may check the connection established through the WLAN based on the bearer ID. In the case of using the NAS message, the NAS message may be a Bearer Resource Modification Request message or EMM or ESM Status message. In the case of using the RRC message, the eNB 1503 may relay the received information to the MME 1505 using an S1_A1 message.

Upon receipt of the above information, the MME 1504 may notify the P-GW 1505 of the WLAN connection loss of the UE via an S-GW at step 1530. In detail, the MME 1504 may transmit a Modify Bearer Command message including the received information to the S-GW to inform of the disconnection of the WLAN connection of the UE 1501.

Upon receipt of any of these messages, the P-GW 1505 may transmit to the PCRF 1506 the information (at least one of connection loss indication information and connection/default bearer identifier) through the IP-Can session modification/termination procedure at step 1535. The information for use in identifying the disconnected connection may be one of a WLAN connection ID, a default bearer ID of the corresponding PDN connection, and a Linked Bearer ID and, if the identifier indicates the bearer established through the E-UTRAN 1503 for the PDN connection, the core network may check the WLAN connection based on the bearer ID.

The PCRF 1506 may check the WLAN connection loss and transmit to the P-GW 1505 at step 1540 the IP flow control information updated in order for the LTE network to relay the whole traffic.

At step 1545, the P-GW 1505 performs the bearer context update procedure in order for the LTE network to relay the whole traffic concerning the UE 1501 based on the information received from WLAN and the information, if any, received from the PCRF 1506. That is, the P-GW 1505 transmits to the S-GW an Update Bearer Request message including a TFT or packet filter configured in order for the LTE network to relay all IP flows and, through this procedure, the IP flow control information, i.e. TFT or packet filter of the EPS bearer context, of the UE 1501 may be updated in order for the LTE network to relay the whole traffic. This operation may be performed through steps 1550, 1555 and 1560, and the messages exchanged at these steps may include at least one of the TFT or QoS information. In detail, it may be possible to switch the traffic path from the TWAN 1502 to the eNB 1503 based on the received message and transmit the traffic to the switched path at step 1550.

Although the description is directed to the case where, when the WLAN connection is disconnected, the UE 1501 notifies the core network of the WLAN connection loss in order for the core network to initiate switching the IP flows to the 3GPP access network, it may also be possible for the UE 1501 to transmit a request for switching the routing path of the IP flows from the WLAN to the 3GPP access network.

In detail, when the WLAN connection is disconnected, the UE 1501 may transmit at least one of the Bearer Resource Modification and Bearer Resource Allocation Request messages including the information for switching the IP flows from the WLAN 1502 to the 3GPP access network (IP flow control information). The IP flow control information may include at least one of IP flow identity information and the information indicating that the corresponding IP flow is routed to the 3GPP access network. If such a message is received, the MME 1504 may send the IP flow control information to the P-GW 1505 by means of a GTP or PMIP message and, if necessary, this information may be transferred to the PCRF 1506.

Upon receipt of the above message, the P-GW/PCRF 1505/1506 may switch routing path for the IP flows from the WLAN 1502 to the 3GPP access network through one of the procedures according to the embodiments of the present invention.

In an embodiment, the UE 1501 may report the WLAN connection state or the disconnection of the WLAN connection by means of the Protocol Configuration Option (PCO). When a WLAN connection state reporting condition is fulfilled or the WLAN connection is disconnected, the UE 150 may notify the core network (P-GW 1505) using the PCO of the WLAN connection state using the PCO. The PCO may include an indicator being set to WLAN Connected, WLAN Not Connected, or Connection Lost to indicate whether the UE 1501 is connected to the WLAN 1502 or not.

In the case that the UE 1501 transmits the PCO to the core network, the PCO may be transmitted via the WLAN 1502 by means of at least one of a WLCP message, an IKE message, and an EAP message. If the message received by the WLAN 1502 (TWAN/TWAG or ePDG) from the UE 1501 includes the PCO, the WLAN 1502 may deliver the PCO to the core network (P-GW 1505) using the following methods.

Case of using GTP: The WLAN includes the PCO received from the UE in the GTP-C message (e.g., Modify Bearer Command and Create Session Request).

Case of using PMIP: The WLAN includes the PCO received from the UE in the PMIP message (e.g., Proxy Binding Update) transmitted to the P-GW.

In the case that the UE 1501 transmits the PCO to the core network, the PCO may be transmitted via the 3GPP access network (E-UTRAN or UTRAN/GERAN) by means of a NAS message. Here, the NAS message may be one of a Bearer Resource Modification Request message, a Bearer Resource Allocation Request message, an ESM status message, and an ESM information response message.

Case of using GTP: The MME/SGSN includes the PCO received from the UE in the GTP-C message (e.g., Modify Bearer Command and Create Session Request) transmitted to the S-GW. The S-GW delivers the received information to the P-GW.

Case of using PMIP: The MME/SGSN includes the PCO received from the UE in the GTP message transmitted to the S-GW. The S-GW includes the PCO received from the MME/SGN in the PMIP message (e.g., Proxy Binding Update) transmitted to the P-GW.

Upon receipt of the above information, the P-GW/PCRF 1505/1506 may switch the routing path for the IP flows from the WLAN 1502 to the 3GPP access network through one of the procedures according to the embodiments of the present invention.

Figure 16:
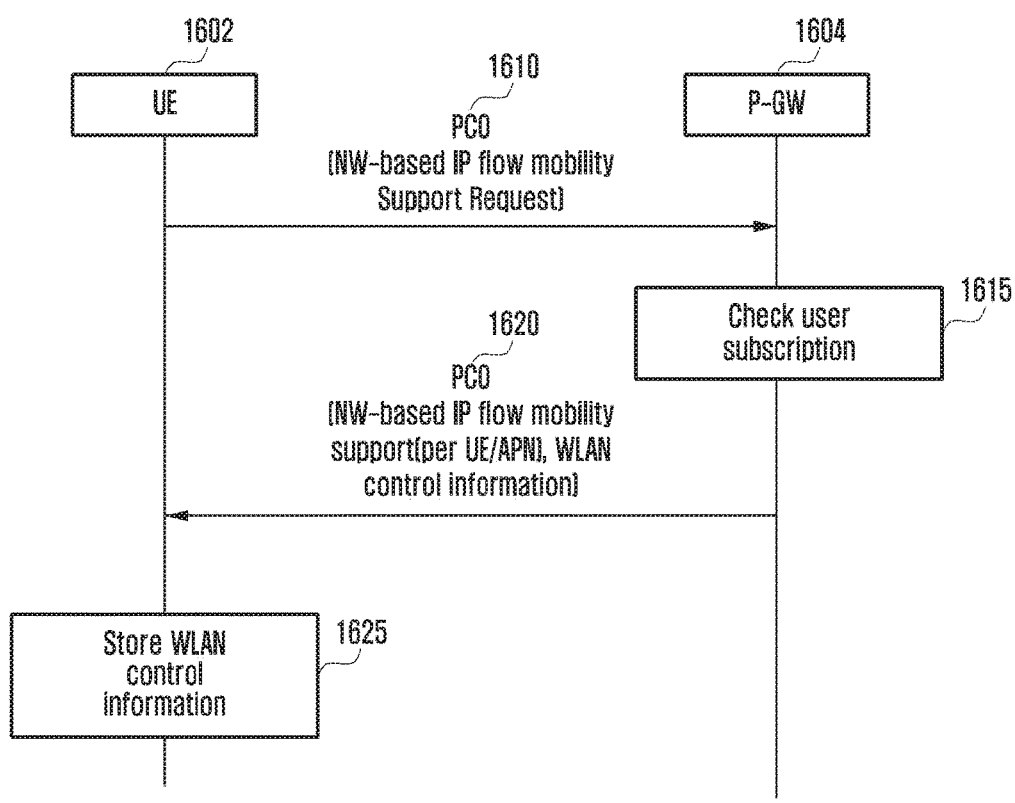
FIG. 16 is a signal flow diagram illustrating signal flows between a UE and a P-GW according to an embodiment of the present invention.

FIG. 16 is a signal flow diagram illustrating signal flows between a UE and a P-GW according to an embodiment of the present invention. In FIG. 16, the UE inquires about the NW-based IP flow mobility supportability of the network (NW), and the network notifies the UE whether it supports the NW-based IP flow mobility.

In reference to FIG. 16, signals may be exchanged between the UE 1602 and the P-GW 1604.

In the case that the UE 1602 supports the NW-based IP flow mobility function and is configured to use the function, it may transmit at step 1610 the Protocol Configuration Option (PCO) including a request of NW-based IP flow mobility supportability of the operator's network during the session management operation. In an embodiment, the NW-based IP flow mobility supportability request may be included in the NW-initiated IP flow mobility support request. This information may be delivered to the P-GW 1604 via the core network.

At step 1615, upon receipt of the message transmitted by the UE 1602, the core network (P-GW 1604) may receive user control information or subscriber information, e.g., rule, from the PCRF along with the NW-based IP flow mobile supportability of the operator's core network. In an embodiment, the core network (P-GW 1604) may determine whether to provide the UE with the NW-based IP flow mobility service based on the rule received from the PCRF or configured/stored information. At this time, whether to provide the NW-based IP flow mobility service may be configured per user, APN, or further smaller traffic unit (e.g., EPS bearer or IP flow with specific QCI).

The P-GW 1604 may transmit at step 1620 a session management message (one of GTP-C message and PMIP message) including the PCO destined for the UE 1602, and the PCO may include the information indicating that the NW supports the NW-based IP flow mobility, e.g., NW-initiated IP flow mobility support.

Whether to apply the NW-based IP flow mobility may be configured per user, per APN, or per further smaller traffic unit (e.g., EPS bearer or IP flow with specific QCI). If the session management message transmitted by the P-GW 1604 is received, the core network node (MME/SGSN or TWAN/ePDG) includes the PCO in the NAS message or WLCP/IKE/EAP message transmitted to the UE 1602.

The UE 1602 stores the received information, at step 1625, for use in checking that the NW-based IP flow mobility is supported and then performs WLAN selection/reporting and an NW-based IP flow mobility operation based on the check result.

Figure 17:
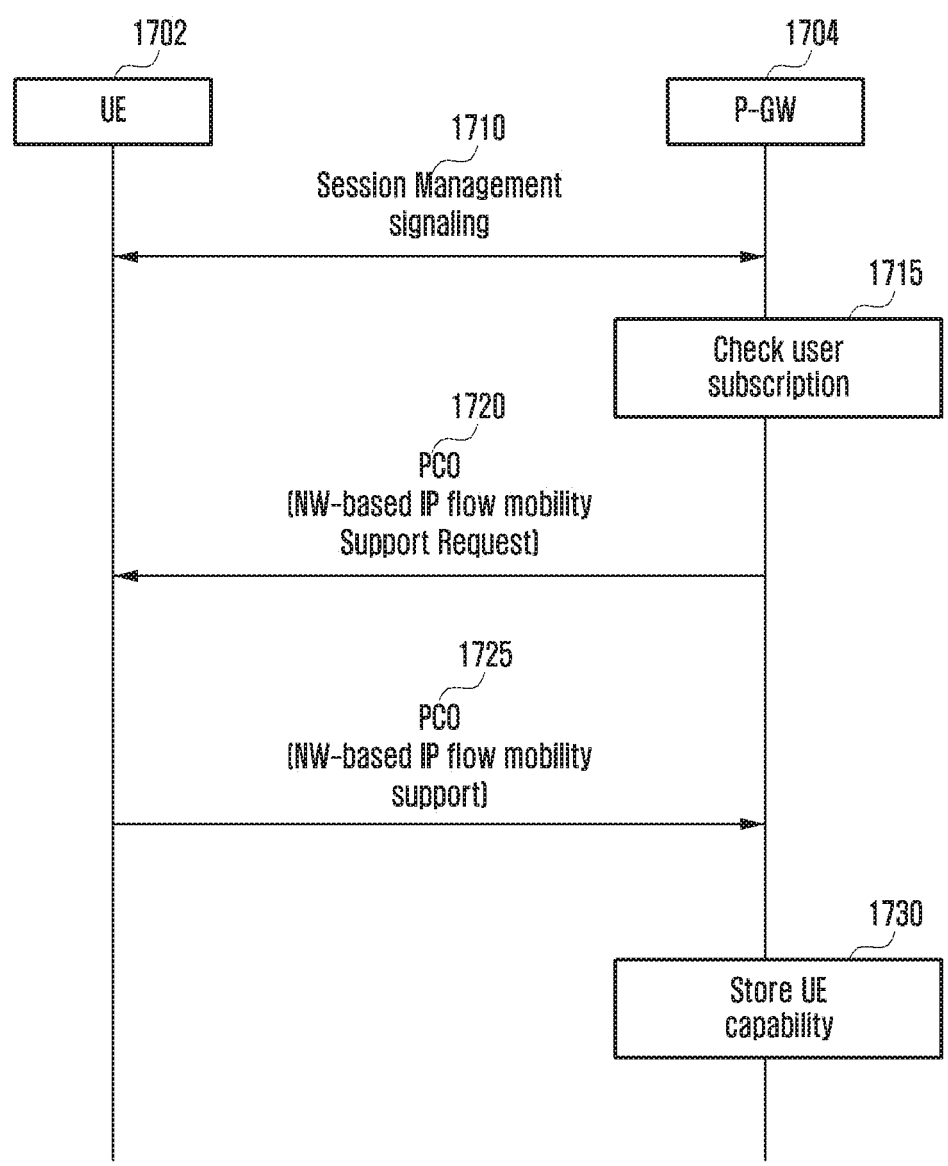
FIG. 17 is a signal flow diagram illustrating signal flows between a UE and a P-GW according to an embodiment of the present invention.

FIG. 17 is a signal flow diagram illustrating signal flows between a UE and a P-GW according to an embodiment of the present invention. In FIG. 17, the UE inquires about the NW-based IP flow mobility supportability of the network (NW), and the network notifies the UE whether it supports the NW-based IP flow mobility.

In reference to FIG. 17, signals may be exchanged between the UE 1702 and the P-GW 1704.

At step 1710, Session Management signals may be exchanged between the UE 1702 and the P-GW 1704. For example, a procedure for establishing/modifying a PDN connection or an EPS bearer, or a procedure for switching a PDN connection or an IP flow from one access network to another may be performed. In an embodiment, step 1710 may be performed optionally.

If it is necessary to perform a Session Management procedure, the P-GW 1704 may receive user control information or subscriber information, e.g. rule, from the PCRF along with the information on whether the operator's network supports the NW-based IP flow mobility and may check the received information at step 1715 to determine whether to apply the NW-based IP flow mobility to the UE 1702. At this time, whether to provide the NW-based IP flow mobility service may be configured per user, APN, or further smaller traffic unit (e.g., EPS bearer or IP flow with specific QCI).

The P-GW may transmit to the UE 1702 a session misstatement message (typically, GTP-C message or PMIP message) with the Protocol Configuration Option (PCO) including an inquiry about NW-based IP flow mobility supportability, e.g., NW-initiated flow mobility support request, at step 1720. Whether to provide the NW-based IP flow mobility service may be configured per user, APN, or further smaller traffic unit (e.g., EPS bearer or IP flow with specific QCI).

If the session management message transmitted by the P-GW 1704 is received, the core network node (MME/SGSN or TWAN/ePDG) transmits to the UE 1704 a NAS message or a WLCP/IKE/EAP message including the PCO. In an embodiment, the message transmission at step 1720 may be performed according to the determination of the P-GW 1704 or in response to the UE 1702.

Upon receipt of the message, the UE 1702 checks its NW-initiated IP flow mobility capability and transmits to the network a session management message including its NW-initiated IP flow mobility capability, e.g. NW-initiated IPI flow mobility support, at step 1725. At this time, whether to provide the NW-based IP flow mobility service may be configured per user, APN, or further smaller traffic unit (e.g., EPS bearer or IP flow with specific QCI).

Upon receipt of the information, the P-GW 1704 may store at step 1730 the received information as a PDN context and check, based on the received information, that it can use the NW-based IP flow mobility usability and perform the NW-based IP flow mobility operation.

In the above-described embodiments, if the same PDN connector or one PDN connection is established through the WLAN and the E-UTRAN, this means that it is possible to perform data communication through the WLAN and E-UTRAN using one IP address. In the case of using the WLAN and the LTE network simultaneously, the P-GW and the UE have to select one of the two access networks for a certain IP flow and, in the above-described embodiments, this determination is made based on the IP flow control information. In order to minimize IP flow routing collision and confusion, the network entity (e.g., PCRF and P-GW) has to generate the IP flow control information such that one access network is selected per IP flow using the following methods.

- Selecting only one access network always per specific IP flow. That is, the IP flow control information (i.e., TFT/packet filter or IP flow descriptor) is configured exclusively for identifying access network-specific traffic.
- Assigning priority to access network for specific IP flow. The entity responsible for making a routing decision for an IP flow (e.g., P-GW in downlink and UE in uplink) selects the access network having the highest priority among the access networks accessible and having the IP flow control information matching thereto.
- In the case that match-all IP flow control information is configured to one access network (i.e., configured to communicate all IP flows), other IP flow control information for other access networks should be configured to communicate a specific IP flow while the access network having the match-all IP flow control information is assigned a low priority.

Although a part of the procedure for the UE to select an access network for a specific IP flow to configure the routing path of the IP flow is omitted in the above-described embodiments, if the UE selects an access network for relaying a specific IP flow, such information may be delivered from the UE to the operator's network for use in determining the access network for relay of the real IP flow. For example, if the UE wants to switch a specific IP flow from one access network to another, the corresponding information may be delivered to the core network (P-GW or PCRF) through an E-UTRAN or WLAN. In the case of using the WLAN, this information may be transmitted to the WLAN by means of a WLCP, EAP, or IKE message and then delivered to the core network by means of a GTP/PMIP message; in the case of using the E-UTRAN, this information may be transmitted to the core network by means of an RRC/NAS message and a GTP/PMIP message. Upon receipt of the information, the core network may finally select the access network based on the received information as described in the above embodiments.

In the case that the UE has a policy/rule received from a policy server (e.g., ANDSF) of the operator's network or user preference information configured by the user, such information may be transmitted from the UE to the operator's network for use in determining the access network for relaying the IP flow. For example, if the UE want to switch a specific IP flow from one access network to another, the corresponding information may be delivered to the core network (P-GW or PCRF) via the E-UTRAN or the WLAN. In the case of using the WLAN, this information may be transmitted to the WLAN by means of a WLCP, EAP, or IKE message and then delivered to the core network by means of a GTP/PMIP message; in the case of using the E-UTRAN, this information may be transmitted to the core network by means of an RRC/NAS message and a GTP/PMIP message.

Upon receipt of the information, the core network may finally select the access network based on the received information as described in the above embodiments.

Figure 18:
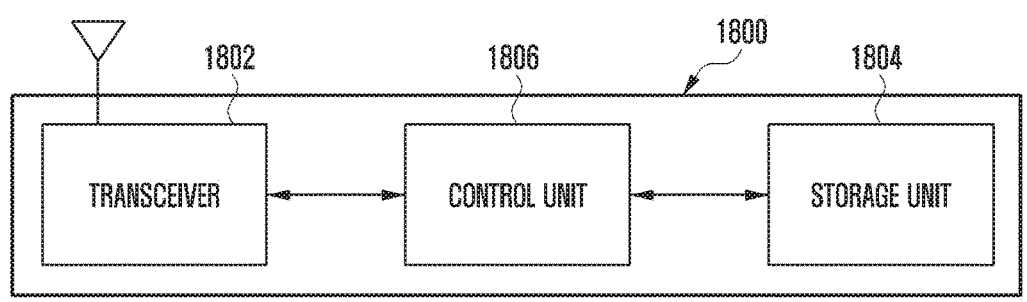
FIG. 18 is a block diagram illustrating a configuration of a UE according to an embodiment of the present invention.

FIG. 18 is a block diagram illustrating a configuration of a UE according to an embodiment of the present invention.

In reference to FIG. 18, the UE 1800 may include at least one of a transceiver 1802, a storage unit 1804, and a control unit 1806.

The transceiver 1802 may communicate signals with a network entity such as an eNB.

The storage unit 1804 may store the information concerning the operations of the UE 1800 and data transmitted/received by the transceiver 1802.

The control unit 1806 may control the overall operations of the UE 1800 and may control the UE 1800 to perform the operations described in the previous embodiments. The control unit 1806 may include at least one processor that is configured with at least one logical or physical module.

Figure 19:
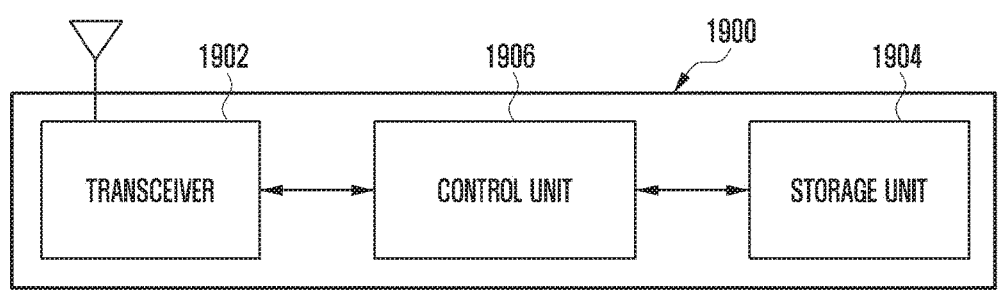
FIG. 19 is a block diagram illustrating a configuration of a core network node according to an embodiment of the present invention.

FIG. 19 is a block diagram illustrating a configuration of a core network node according to an embodiment of the present invention. The core network node may be one of an eNB, an MME, a P-GW, an S-GW, a PCRF, a user subscription database, and an HSS.

In reference to FIG. 19, the core network node 1900 may include at least one of a transceiver 1902, a storage unit 1904, and a control unit 1806.

The transceiver 1902 may communicate signals with a UE or another core network node.

The storage unit 1904 may store the information concerning the operations of the core network node 1900 and data transmitted/received by the transceiver 1902.

The control unit 1906 may control the overall operations of the core network node 1900 and may control the core network node 1900 to perform the operations described in the previous embodiments. The control unit 1906 may include at least one processor that is configured with at least one logical or physical module.

Figure 20:
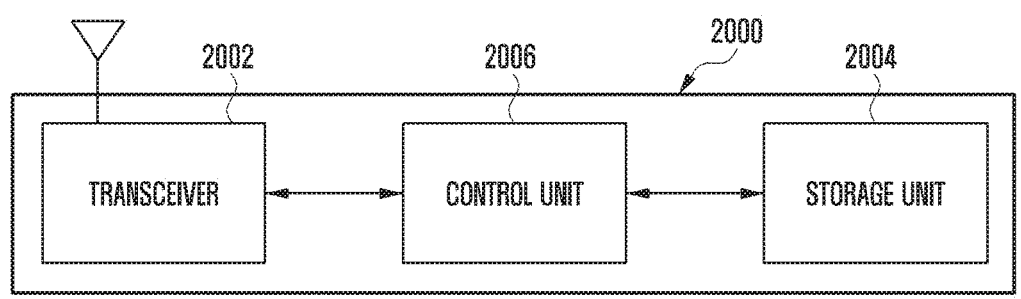
FIG. 20 is a block diagram illustrating a configuration of a WLAN according to an embodiment of the present invention.

FIG. 20 is a block diagram illustrating a configuration of a WLAN according to an embodiment of the present invention. In reference to FIG. 20, the WLAN 2000 may include a transceiver 2002, a storage unit 2004, and a control unit 2006.

The transceiver 2002 may communicate signals with a UE or another core network node.

The storage unit 2004 may store the information concerning the operations of the WLAN 2000 and data transmitted/received by the transceiver 2002.

The control unit 2006 may control the overall operations of the WLAN 2000 and may control the WLAN 2000 to perform the operations described in the previous embodiments. The control unit 2006 may include at least one processor that is configured with at least one logical or physical module.

In the above described embodiments of the present invention, the steps are selectively performed or omitted. In each embodiment of the present invention, the steps do not need to be performed in the sequential order as depicted, and they may be performed in a changed order. The embodiments of the present invention, which are described in the specification with reference to the accompanying drawings, are to be regarded in an illustrative rather than a restrictive sense in order to help understand the present invention. It is obvious to those skilled in the art that various modifications and changes can be made thereto without departing from the broader spirit and scope of the invention.

Although various embodiments of the present invention have been described using specific terms, the specification and drawings are to be regarded in an illustrative rather than a restrictive sense in order to help understand the present invention. Thus the scope of the invention should not be construed as being limited to the exemplary embodiments, rather it should be recognized as contemplating various changes and modifications within the spirit and scope of the invention.

The invention claimed is:

1. A signal communication method of a terminal in a mobile communication system, the method comprising:
    transmitting to a packet data network gateway (P-GW) a first control message including an indicator indicating whether or not the terminal supports network-based internet protocol (IP) flow mobility (NB IFOM);
    receiving a response message including wireless local area network (WLAN) control information for supporting the NB IFOM from the P-GW in response to the first message;
    attempting packet data network (PDN) connection via a base station and a WLAN based on the response message;
    receiving routing information for supporting the NB IFOM;
    selecting one of the base station and the WLAN for transporting specific traffic based on the routing information;
    receiving a second control message including information for updating the routing information; and
    performing an operation for changing a bearer based on the second control message.

2. The method of claim 1, further comprising transmitting a third control message including WLAN connection state information.

3. A terminal of a mobile communication system, the terminal comprising:
    a transceiver; and
    at least one processor coupled with the transceiver,
    wherein the at least one processor is configured to:
        transmit to a packet data network gateway (P-GW) a first control message including an indicator indicating whether or not the terminal supports network-based internet protocol (IP) flow mobility (NB IFOM),
        receive a response message including wireless local area network (WLAN) control information for supporting the NB IFOM from the P-GW in response to the first message,
        attempt a packet data network (PDN) connection via a base station and a WLAN based on the response message,
        receive routing information for supporting the NB IFOM,
        select one of the base station and the WLAN for transporting specific traffic based on the routing information,
        receive a second control message including information for updating the routing information, and
        perform an operation for changing a bearer based on the second control message.

4. The terminal of claim 3, wherein the at least one processor is further configured to transmit a third control message including WLAN connection state information.

* * * * *